United States Patent
Gunter et al.

(10) Patent No.: US 6,412,559 B1
(45) Date of Patent: Jul. 2, 2002

(54) PROCESS FOR RECOVERING METHANE AND/OR SEQUESTERING FLUIDS

(75) Inventors: William Daniel Gunter, Edmonton (CA); Matthew John Mavor, Park City, UT (US); David Hin-Sum Law, Edmonton (CA)

(73) Assignee: Alberta Research Council Inc., Edmonton (CA)

( * ) Notice: Subject to any disclaimer, the term of this patent is extended or adjusted under 35 U.S.C. 154(b) by 0 days.

(21) Appl. No.: 09/740,081

(22) Filed: Dec. 18, 2000

Related U.S. Application Data
(60) Provisional application No. 60/252,956, filed on Nov. 24, 2000.

(51) Int. Cl.[7] ..................... E21B 43/17; E21B 43/267; B01D 53/02
(52) U.S. Cl. ..................... 166/271; 166/263; 166/280; 405/129.4
(58) Field of Search ............................... 166/263, 271, 166/280, 308; 299/12; 405/129.35, 129.4

(56) References Cited

U.S. PATENT DOCUMENTS

| | | | |
|---|---|---|---|
| 4,043,395 A | | 8/1977 | Every et al. ............... 166/263 |
| 4,283,089 A | * | 8/1981 | Mazza et al. ........... 166/308 X |
| 4,391,327 A | * | 7/1983 | De Carlo .................. 299/12 X |
| 4,474,409 A | * | 10/1984 | Trevits et al. ............. 299/12 X |
| 4,544,037 A | | 10/1985 | Terry ......................... 166/369 |
| 4,665,990 A | * | 5/1987 | Perlman .................. 166/280 X |
| 4,913,237 A | * | 4/1990 | Kutas ......................... 166/308 |
| 5,014,788 A | * | 5/1991 | Puri et al. .................... 166/308 |
| 5,147,111 A | | 9/1992 | Montgomery ................. 299/16 |
| 5,332,036 A | | 7/1994 | Shirley et al. .............. 166/268 |
| 5,388,640 A | | 2/1995 | Puri et al. .................... 166/263 |
| 5,402,847 A | | 4/1995 | Wilson et al. .............. 166/263 |
| 5,439,054 A | | 8/1995 | Chaback et al. ............ 166/252 |
| 5,454,666 A | | 10/1995 | Chaback et al. ............... 405/52 |
| 5,566,756 A | | 10/1996 | Chaback et al. ............ 166/263 |
| 5,769,165 A | * | 6/1998 | Bross et al. ............ 166/263 X |

OTHER PUBLICATIONS

Ely, John W., "Fracturing Fluids and Addivites", Recent Advances in Hydraulic Fracturing, John L. Gidley, ed., SPE Monograph Series, vol. 12, pp. 131–146, 1989.*

Agarwal R.G. et al. "An investigation of Wellbore Storage and Skin Effect in Unsteady Liquid Flow: I. Analytical Treatment" SPE Journal 279–290; Sep. 1970.

Ali, et al. "Injection Above–Parting–Pressure Waterflood Pilot, Vallhall Field, Norway" SPE 22893, 1991.

Johnson, E.F. et al. "Calculation of Relative Permeability from Displacement Experiments" Pet. Trans. AIME 216: 1023–G; 1959.

Mavor, M. et al. "Coalbed Reservoir Gas–In–Place Analysis" GRI Report No. GRI–97/0263, pp. 3.1–3.20, Nov., 1997.

Mavor, M. et al. "Coalbed Methane Well Testing" in *A Guide to Coalbed Methane Reservoir Engineering* GRI Report No. GRI–94/0397, Chapter 5; Mar. 1996.

(List continued on next page.)

Primary Examiner—George Suchfield
(74) Attorney, Agent, or Firm—Kurt D. Van Tassel; Deborah G. VandenHoff; Van Tassel & Associates

(57) ABSTRACT

A process for recovering methane from a coal bed and/or sequestering a fluid more strongly adsorbing than methane ("SAG") in a coal bed involves fracturing an injection well and cyclically injecting SAG with intervening shut-in periods. Even though the absolute permeability of the coal bed decreases with continued SAG sorption, the SAG injectivity, surprisingly and unexpectedly, increases while injecting SAG at pressures greater than reservoir pressure, but less than fracture pressure or fracture extension pressure. The increased injectivity is thought to be due to a reduction in near-well flow resistance.

37 Claims, 7 Drawing Sheets

OTHER PUBLICATIONS

Palmer, I.D. "Comparison Between Gel–Fracture and Water-Fracture Simulations in the Black Warrior Basin", Proceedings of the 1991 Coalbed Methane Symposium, The University of Alabama/Tuscaloosa, 9139, May 13–16, 1991, pp. 233–242.

Palmer, I.D. "Induced Stresses Due to Propped Hydraulic Fracture in Coalbed Methane Wells" SPE 25861, 1993.

Palmer, I.D. "Review of Coalbed Methane Well Stimulation" SPE 22395, 1992.

Stevens et al. "Enhanced Coalbed Methane Recovery Using $CO_2$ Injection: Worldwide Resource and $CO_2$ Sequestration Potential" SPE48881; 1998.

Zheng, et al. "Pore Volume Compressibility and Permeability of Coal Under Different Stress Conditions" International Gas Research Conference; pp. 77–86; 1992.

* cited by examiner

PROCESS FOR RECOVERING METHANE AND/OR SEQUESTERING FLUIDS

This application claims the benefit of U.S. Provisional Application, Serial No. 60/252,956, filed in the names of William Daniel Gunter, Matthew John Mavor and David Hin-Sum Law on Nov. 24, 2000.

FIELD OF THE INVENTION

The present invention relates to the field of coalbed methane and, in particular, to a process for sequestering fluids, such as carbon dioxide and hydrogen sulfide, in a coal bed, and/or recovering methane from a coal bed.

BACKGROUND OF THE INVENTION

Coalbed methane (CBM) has become a significant component of U.S. natural gas supplies. CBM production increased to 2.9 Bscf/day of gas supply in 1997, accounting for about 6% of total U.S. natural gas production (Stevens et al., "Enhanced Coalbed Methane Recovery using $CO_2$ Injection: Worldwide Resource and $CO_2$ Sequestration Potential" SPE 48881; 1998).

Most CBM reservoirs are produced under primary recovery methods, i.e., without secondary recovery methods involving injection of recovery-enhancing fluids. The proportion of original gas-in-place that can be recovered is dependent on reservoir properties, in particular, the absolute permeability of the coal bed. In high permeability reservoirs (>20 millidarcy (md)), recovery can theoretically be up to 80% of original gas-in-place. CBM recovery in moderate permeability reservoirs (5 to 20 md) can range from 50 to 70%, while recovery in low permeability reservoirs ($\leq 5$ md) can range from 10 to 50%. CBM recovery is also dependent on production economics. Presently, low permeability reservoirs are unlikely to produce CBM at commercial rates without some form of enhanced recovery. Moreover, the volume of CBM remaining after primary production, especially in moderate and low permeability reservoirs, is significant. For example, it is estimated that primary production in developed areas of the San Juan Basin alone, which are generally high permeability reservoirs, may leave behind as much as 10 Tscf of natural gas in areas with depleted coal beds (Stevens et al., ibid).

New technologies have been proposed for enhanced coalbed methane recovery (ECBM) to recover a larger fraction of CBM in place. The two principal variants of ECBM are (1) inert gas stripping by injecting nitrogen ($N_2$), which is a weaker adsorbing gas (WAG) than $CH_4$, and (2) displacement desorption by injecting carbon dioxide ($CO_2$), a stronger adsorbing gas (SAG) than $CH_4$.

Generally, as an injected WAG enters a coal bed through a wellbore, the partial pressure observed for CBM in the vicinity of the wellbore is substantially reduced. Most significantly, it is believed that the CBM partial pressure in the wellbore vicinity can be reduced to particularly low levels as a WAG is injected. Consequently, it is believed that as the CBM partial pressure is reduced, the CBM desorption rate from coal increases dramatically and the CBM is swept substantially through the coal bed in a mixture with the WAG to a production well. The production rate of the WAG and CBM is controlled by the total pressure in the formation, which is maintained as high as possible by injection during this process. Some WAG is sorbed into the coal, but there is a net reduction in the total gas (i.e., CBM and WAG) content of the coal.

By contrast, generally, as a gas that is more strongly adsorbing than $CH_4$ is injected into the coal bed, it is believed to be preferentially adsorbed into the coal. Since the SAGs are generally not produced, this process works well for both enhanced CBM recovery and sequestration of SAGs, such as $CO_2$ or hydrogen sulfide ($H_2S$). And there is a net increase in the total gas (i.e., SAG and CBM) content of the coal. Also, the SAG is typically trapped in situ and is not produced unless the injected SAG front reaches the production well (i.e., breakthrough). At breakthrough, this type of SAG injection and CBM displacement process would be terminated.

Thus, a secondary benefit associated with a SAG injection/CBM displacement process, such as the $CO_2$-ECBM process, is that it can sequester large volumes of $CO_2$. There is an increasing concern that some gaseous effluent streams from industrial processes may cause environmental problems, and, as a result, these streams should not be released into the atmosphere. $CO_2$ is a constituent of many gaseous effluent streams released from industrial processes and whose release into the atmosphere is causing increasing concern. Should global restrictions on $CO_2$ emissions be promulgated, $CO_2$-ECBM could be one of the few profitable technologies for sequestering $CO_2$. For instance, tradable credits for $CO_2$ sequestration could dramatically improve $CO_2$-ECBM economics over current performance levels.

Some global warming proponents relate excess nitrous oxide ($N_2O$), as well as $CO_2$, emissions to climatological change. Also, nitrogen oxide ($NO_x$)) emissions, such as nitric oxide (NO) or nitrogen dioxide ($NO_2$), in sufficient concentration, can be toxic to health and the environment. Additionally, sulfur oxide ($SO_x$) emissions, in sufficient concentration, can contribute to the production of "acid rain," which can have a detrimental effect on various plant and aquatic life.

Thus, it is possible that many or all of these gases could become more stringently regulated, at least in certain market-developed countries or regions, such as the United States, Canada, Japan and Europe. Consequently, this prospect of increasing regulatory stringency for some or all gaseous emissions can hamper many industries because the combustion of virtually any hydrocarbon fuel with air produces an effluent containing $CO_2$, $N_2$, and gaseous combustion products.

For instance, various countries, including, among others, France, Germany, the United Kingdom, Australia, the United States, Canada and Japan have agreed to seek internal approval and adoption, within their respective jurisdictions, of the Kyoto Protocol. The Kyoto Protocol ensued from the United Nations Framework Convention on Climate Change, held in December, 1997 at Kyoto, Japan. Under the Kyoto Protocol, each participant agreed in principle to "implement and/or further elaborate policies and measures in accordance with its national circumstances" to, among other things, enhance energy efficiency and protect reservoirs of certain atmospheric gases not controlled by the Montreal Protocol (e.g., $CO_2$).

Generally, under the Kyoto Protocol, the participating countries agreed to limit emissions of greenhouse gases specified under the Protocol, including $CO_2$, $CH_4$, $N_2O$, hydrofluorocarbons (HFCs), perfluorocarbons (PFCs), and sulfur hexafluoride ($SF_6$), as well as work towards reducing the overall emissions of these gases by at least 5% below 1990 levels in the target period of 2008 to 2012. To date, no legislative amendments to the U.S. Clean Air Act Amendments of 1990 (CAAA) have been passed that would require facilities operating in the U.S. to comply with the Kyoto Protocol greenhouse gas emissions target. Nonetheless, the present U.S. administration has made a policy decision to promote voluntary compliance with the Kyoto Protocol. Accordingly, companies operating in the U.S. that have significant $CO_2$ emissions have been encouraged to voluntarily work towards the Kyoto Protocol's target level for the greenhouse gases specified. Also, if good progress towards the Protocol's goals is not shown, it is possible that some further amendments to the CAAA could flow from the Kyoto Protocol. CAAA amendments conforming with the Kyoto Protocol could also be motivated if models are developed to more definitively measure and predict the extent of global climate changes based on current and projected gaseous emissions. Thus, limiting the gaseous emissions, particularly from coal-fueled power generation plants, while maintaining an energy efficient power generation process, is becoming a more important commercial objective.

In addition to being a hydrocarbon combustion product, $CO_2$ can be produced by natural processes and released to the environment during a non-combustion process. For example, $CO_2$ is produced by thermal and biogenic processes, which are believed to form hydrocarbons such as oil, natural gas, or coal. $CO_2$ often is recovered with these hydrocarbons and released to the atmosphere by various post-production steps.

The increasing concern over the atmospheric release of $CO_2$ and other undesired gas emissions compounds demands a method(s) for disposing of the compounds, once collected.

Injection of $CO_2$ and other compounds into a coal bed has been proposed for their disposal. As discussed above, various $CO_2$-ECBM recovery or $CO_2$ sequestration processes have been disclosed. However, none of those processes that are known to the inventors either exploit or properly teach how to exploit the beneficial effect of hydraulically fracturing the coal bed around the injection well to improve CBM recovery and/or enhance $CO_2$ sequestration. Moreover, the prevailing view in the industry is that $CO_2$-ECBM recovery or $CO_2$ sequestration processes should be conducted without stimulating the injection well region. This is in contrast to production wells, which are typically stimulated. The industry view concerning injection wells arises from the likelihood that one or more fractures will extend too close to the production well and/or into a non-coal bed region (e.g., an adjacent sandstone formation). Naturally, such fracture(s) would substantially reduce an injection fluid's sweep efficiency. The fracture(s) would cause the injection fluid to effectively bypass the coal bed formation through an adjacent non-coal bed formation or by traveling directly to the production well with little to no coal bed contact. And without coal bed contact, a SAG, such as $CO_2$, can neither displace $CH_4$ nor be sequestered.

U.S. Pat. No. 4,043,395 (Every et al., Aug. 23, 1977) describes a method for recovering $CH_4$ from a coal bed by injecting a $CO_2$-containing fluid and then shutting-in the formation to desorb $CH_4$ from the coal. The injection and shut-in steps are repeated. While Every et al. acknowledge that the $CO_2$-containing fluid must be injected at a pressure to overcome the reservoir pressure, they state that the injection pressure must not exceed the fracture pressure (col. 2,l. 61–62). Moreover, Every et al. teach that "increasing the injection pressure has little effect on the total amount of methane displaced" (col. 7, l. 22–23).

U.S. Pat. No. 5,332,036 (Shirley et al., Jul. 26, 1994) relates to a method for $CH_4$ recovery by injecting a strongly adsorbable fluid and then injecting a weakly adsorbable fluid to force the strongly adsorbable fluid through pores, cracks and seams in the formation towards a production well. Shirley et al. state that as liquefied $CO_2$, a strongly adsorbable fluid, moves through the coal deposit, it fractures the deposit and releases $CH_4$. Then $N_2$ is injected to push the $CO_2$ towards the production well. "The body of liquefied carbon dioxide appears to act as a buffer between the methane and the nitrogen, thereby tending [to] inhibit mixing of the nitrogen with the methane being recovered" (col. 5, l. 32–35).

However, it is well understood by those skilled in the art that liquid $CO_2$ will vaporize in a reservoir when it is injected into the reservoir at a temperature greater than 31°C. (88° F.), the critical temperature of $CO_2$, regardless of the pressure. Liquid $CO_2$, injected at the surface at about −29° C. (−20° F.), can enter the reservoir below the critical temperature if injected at high rates (i.e., greater than 8 $m^3$/min (2,100 gal/min)) for sufficient time to cool down the wellbore. However, once $CO_2$ enters the reservoir, it warms and vaporizes. This limits the applicability of Shirley et al.'s liquid $CO_2$ injection to shallow coal beds and regions near the wellbore. An example of a shallow coal bed, in which $CO_2$ can remain in the liquid state, is the Powder River Basin in Wyoming, which has a reservoir temperature of 18° C. (65° F.) at a depth of 189 m (600 ft). However, many commercially significant coal beds are found at a depth of 610–1,220 m (2,000–6,000 ft), where reservoir temperatures are in the range of 32–54° C. (90–150° F.). Liquid $CO_2$ would vaporize in these reservoirs, contrary to Shirley et al.'s teachings.

Moreover, $N_2$ cannot push $CO_2$ through the formation in the manner that Shirley et al. suggest. When injected, $CO_2$ will adsorb into the coal matrix close to the injection well, thereby releasing $CH_4$. Subsequent $N_2$ injection may cause a minor portion of the $CO_2$ to be released. But the majority of the $CO_2$ will remain in the adsorbed state. Thus, $N_2$ and $CH_4$ will mix and travel further into the reservoir and not displace $CO_2$.

U.S. Pat. No. 5,147,111 (Montgomery, Sep. 15, 1992) teaches cavitation stimulation for improving $CH_4$ production in a primary recovery operation. Cavitation is induced by injecting liquid $CO_2$, while maintaining back-pressure on the well annulus, to cool tubing to a temperature below $CO_2$'s critical temperature. The annulus is shut-in and additional $CO_2$ is injected. Injection is stopped and the pressure is allowed to build to 1,500 to 2,000 psia. The pressure is quickly released and $CO_2$ is vaporized, thereby causing coal failure and fragmentation. $CH_4$ is then produced from the well.

U.S. Pat. No. 5,402,847 (Wilson et al., Apr. 4, 1995) discloses $CH_4$ production by continuously injecting a $CO_2$-containing exhaust gas from a hydrocarbon-fueled internal combustion engine. Wilson et al. indicate the injection pressure must be greater than the reservoir pressure. However, there is no suggestion to inject at a pressure greater than the fracture pressure or the fracture extension pressure. Wilson et al. teach increasing permeability by injecting exhaust gas at a temperature at or above 350° F. to vaporize water. Wilson et al. suggest that this increased gas temperature aids in converting water residing in the cleat system into steam, which leads to enlarging cleats and creating new fractures. Wilson et al. also suggest cyclically varying the injection temperature to expand and contract the coal.

U.S. Pat. Nos. 5,439,054 and 5,566,756 (Chaback et al., Aug. 8, 1995 and Oct. 22, 1996, respectively) describe a process for recovering $CH_4$ by injecting a weaker adsorbing fluid and a stronger adsorbing fluid mixture. Chaback et al. teach injecting a desorbing fluid, such as $CO_2$, or a $N_2$-enriched gaseous fluid, which is not preferentially sorbed by the formation (i.e., a raffinate), into a formation at a pressure greater than the reservoir pressure. On one hand, Chaback et al. state that injection pressures at or above the fracture pressure are problematic because the injection fluid will be lost and less $CH_4$ may be produced ('054: col. 15,l. 50–56; '756: col. 15,l. 14–19). On the other hand, Chaback et al. state that injection above the fracture pressure may be required, but recognize that inducing fractures that extend from the injection well to the production well must be avoided ('054: col. 15,l. 57–67; '756: col. 15,l. 20–29). Although Chaback et al. recognize the fracture extension problem, the discussion on how to resolve the problem is limited to references that discuss hydraulic fracturing of conventional oil and gas formations (i.e., non-coal bed formations). Chaback et al. cite a Society of Petroleum Engineers monograph (Gidley et al., Vol. 12; 1989) and other enhanced oil recovery (EOR) references for hydraulic fracturing techniques for controlling length, azimuth and height growth (see '054: col. 16,l. 5–31; '756: col. 15,l. 35–58). However, as discussed more fully below, there are significant differences between coal bed formations and inorganic rock formations where EOR can be practiced. Accordingly, the teachings in these cited references are not translatable to the unique problem of controlling the fracture length, azimuth and height growth in coal beds used for recovering ECBM and/or sequestering unwanted gas(es).

U.S. Pat. No. 5,454,666 (Chaback et al., Oct. 3, 1995) describe a method for sequestering unwanted gas in a $CH_4$-depleted coal bed. Chaback et al. suggest that the injection pressure should be selected to optimize sorption of the unwanted gas, but make no suggestion to hydraulically fracture the coal bed. Chaback et al. only suggest to inject the unwanted gas in sufficient volumes to saturate the formation with the unwanted gas. Also, the Chaback et al.'s sequestering purpose suggests to those skilled in the art that hydraulically fracturing the coal bed would reduce the formation's sequestration capacity and/or risk the chance of extending a fracture into an adjacent non-coal bed formation, where the unwanted gas may not be effectively sequestered, if at all.

Stevens et al. (ibid) is an overview of the worldwide potential for $CO_2$-ECBM processes based on existing ECBM data collected by a number of notable companies. Stevens et al. teach that "Injection wells should be completed unstimulated, while production wells can be cavitated or hydraulically stimulated" (pg. 489). Later, in their $CO_2$ sources discussion (pg. 491), Stevens et al. discuss Burlington and Shell $CO_2$ Co. operations in the San Juan Basin, where $CO_2$ is injected "safely below the formation fracture gradient" Moreover, Stevens et al.'s review of Burlington's Allison Unit in the San Juan Basin, New Mexico concluded: "Although initially intended to allow pressure buildup within the reservoir, in order to promote substitution of $CO_2$ for methane, shutting in the wells may have been detrimental to gas production" (pg. 490). Accordingly, Stevens et al. failed to recognize the beneficial effect of injecting $CO_2$ into a coal bed formation above the formation's fracture pressure and thus discouraged such a process.

As discussed above, Chaback et al. in U.S. Pat. Nos. 5,439,054 and 5,566,756 suggest that there are some cases where conventional gas production technology can be applied to producing CBM from a coal bed formation. However, there are several reasons why conventional oil and gas stimulation techniques, most notably hydraulic fracturing techniques, either cannot be translated to CBM recovery or gas sequestration, or, if at all translatable, require significant modification. Generally, these reasons relate to differences in fracture pressure, formation stiffness, fracture geometry, and swelling of the distinctly different types of rocks from which conventional oil and gas deposits versus CBM are produced.

One significant difference between coal versus conventional sandstone or limestone formations is the significantly higher fracture extension pressures in coal bed formations. The fracture extension pressure in a typical coal formation is in the range of from about 0.9 psi per foot of formation depth (20.6 kPa/m) to about 2.5 psi/ft (56.5 kPa/m), while the fracture extension pressure of a conventional formation is generally less than about 1.0 psi per foot (22.6 kPa/m). The high fracture extension pressure is believed to be due to induced fracture tortuosity, multiple induced fractures, and complex fracture geometry. As a result, an induced fracture will tend to grow from a coal bed to an adjacent rock layer, for example, sandstone, having a lower in-situ stress. When this occurs, injected fluids may have limited, if any, contact with the coal, thereby reducing the efficiency of $CH_4$ recovery, and/or sequestration of stronger adsorbing gases, such as, for example, $CO_2$, hydrogen sulfide ($H_2S$), $SO_2NO_2$ and the like. Accordingly, once a fracture is formed or extended it must be carefully controlled to ensure that it does not extend into a non-coal formation where the internal stress is significantly lower. Therefore, in view of this particular problem of fracture extension control in coal beds, those skilled in the art have refrained from inducing fractures in injection wells and discouraged their use in coal bed formations.

A second significant difference between coal beds and sandstone hydraulic fracturing is due to the stiffness of the two formations. Rock stiffness is quantified by measurements of Young's Modulus. Young's Modulus for coal ranges between 100,000 and 500,000 psi, an order of magnitude less than for sandstone, which ranges from 2 to 13 million psi. As a result, induced fracture widths in coal can be one inch or greater while those in sandstone are less than 0.2 inches. However, creating wide induced fractures in a coal bed closes smaller natural fractures due to compression of the coal matrix. As a result, the permeability of the natural fracture near (i.e., up to about 50 ft) the induced fracture can be reduced to one-tenth the natural fracture's original permeability. Therefore, wide fractures can cause significant formation damage in coal.

A third significant difference is that unusual induced fracture geometries have been observed in coal, including multiple vertical fractures in bands one foot wide, combinations of multiple and vertical fractures, vertical fractures, which are spaced many feet apart from each other, that initiated from horizontal fracture planes, and fractures oriented parallel to the face cleats (dominant coal fracture orientation) at right angles to the maximum horizontal stress orientation. Multiple induced fractures and fracture orientations may reduce the effective length of the induced fracture from wellbore to tip, reducing the stimulation effectiveness. These observations are significantly different from sandstone studies, where fractures are typically believed to create one failure surface that extends from the wellbore into the reservoir.

A fourth significant difference between coal and other rock types is the ability of coal to sorb substances, including gases and stimulation chemicals. Upon sorption, the coal matrix swells and closes natural fractures, thereby reducing natural fracture permeability. However, conventional formations have little to no sorption capacity. Consequently, they cannot be induced to swell like a coal bed formation.

Other coal bed formation properties affecting its behavior include porosity and permeability. Regarding porosity properties, coal is characterized by two distinct porosity systems, discussed more fully below: a primary porosity system and a secondary porosity system. The primary porosity system contains the vast majority of the gas-in-place, while the secondary porosity system provides the conduit for mass transfer to wells.

Primary porosity gas storage is dominated by adsorption phenomena because of the high surface area to volume ratio and the close proximity of gas molecules to molecules within solid materials. The gas and solid molecules attract each other due to weak intermolecular forces known as Van der Waals forces. Due to attraction to the solid, gas molecules are packed closer together than expected from the pressure and temperature conditions. The equivalent density of the molecules in the sorbed state is similar to the density of the molecules in a liquid state.

By contrast, in conventional reservoirs, such as in high permeability sandstone, sorption is negligible and gas storage is dominated by the free gas state. The density of gas in the free gas state is controlled by and can be predicted from the pressure and temperature conditions of the reservoir and the gas composition.

In coal beds, the primary porosity system is relatively impermeable due to the small pore sizes. Mass transfer for each gas molecular species is dominated by diffusion that is driven by the concentration gradient (i.e., change in concentration along a flow path divided by the length of the flow path) for each molecular species. Diffusion is usually not significant during production of conventional sandstone or limestone formations.

Commercially productive CBM reservoirs contain a well-developed secondary porosity system/fracture system. Without natural fractures, commercial production from CBM reservoirs would not be possible due to the low permeability of the primary porosity system. Flow through the secondary porosity system is due to pressure gradients through the fracture system towards production wells.

Accordingly, there is a need for a CBM recovery process and/or a gas sequestration process that improves the CBM recovery economics and/or gas sequestration. The inventors have discovered hydraulic fracturing around a CBM injection well can further enhance the CBM recovery and/or gas sequestration process, despite the prevailing view in the industry that injection pressures above fracture pressure, more particularly fracture extension pressures, which are greater than fracture pressures, should be avoided around the coal bed injection well.

SUMMARY OF THE INVENTION

According to the present invention, there is provided a process for sequestering a stronger adsorbing fluid in a coal bed, having a SAG sorption time $T_{S-SAG}$, a reservoir pressure $P_R$, a fracture pressure $P_F$, a fracture extension pressure $P_E$ and a crack initiation pressure $P_C$, wherein $P_C > P_E > P_F > P_R$, and having at least one injection well, comprising the steps of: (a) stimulating the injection well by (i) inducing a fracture in the coal bed by injecting an injection fluid in the injection well at a pressure greater than or equal to $P_C$; and (ii) extending the fracture by injecting the injection fluid in the injection well at a pressure greater than or equal to $P_E$; (b) injecting a stronger adsorbing fluid into the injection well at a pressure greater than $P_R$; (c) shutting in the injection well for at least about $0.5T_{S-SAG}$; and (d) repeating steps (b) and (c) at least once.

According to the present invention, there is also provided a process for recovering methane from a coal bed, having a SAG sorption time $T_{S-SAG}$, a reservoir pressure $P_R$, a fracture pressure $P_F$, a fracture extension pressure $P_E$ and a crack initiation pressure $P_C$, wherein $P_C > P_E > P_F > P_R$, and having at least one injection well and at least one production well, comprising the steps of: (a) stimulating the injection well by (i) inducing a fracture in the coal bed by injecting an injection fluid in the injection well at a pressure greater than or equal to $P_C$; and (ii) extending the fracture by injecting the injection fluid in the injection well at a pressure greater than or equal to $P_E$; (b) injecting a stronger adsorbing fluid into the injection well at a pressure greater than $P_R$ and recovering methane from the formation; (c) shutting in the injection well for at least about $0.5T_{S-SAG}$; and (d) repeating steps (b) and (c) at least once.

BRIEF DESCRIPTION OF THE DRAWINGS

The process of the present invention will be better understood by referring to the following detailed description of preferred embodiments and the drawings referenced therein, in which.

DETAILED DESCRIPTION OF THE PREFERRED EMBODIMENTS

Definitions

"Coal" is a combustible rock, containing more than about 50% by weight carbonaceous material, formed by compaction and induration of plant matter. Coal is classified by type (kinds of plant matter), rank (degree of metamorphism) and grade (degree of impurity). Coal also contains minerals, typically clay minerals, such as kaolinite and montmorillonite. Higher coal ranks tend to have greater amounts of associated $CH_4$. Accordingly, coal comprises, without limitation, carbon, hydrogen, nitrogen, oxygen, sulfur, phosphorus, silicon, calcium, magnesium and heavy metals.

A "coal bed" or "coal seam" is a stratum or bed of coal.

A "coal bed formation" refers to a body of strata containing coal beds and typically one or more other strata including, without limitation, clay, shale, carbonaceous shale, sandstone and other inorganic rock types. While a coal bed formation generally contains organic matter, at any one location the thickness of organic matter present can vary from almost none to nearly 100% of the formation thickness.

"Coalbed methane" (CBM), also known as "coal gas," is a natural gas consisting of $CH_4$, lesser amounts of ethane, propane and higher hydrocarbons, and inorganic gases, such as $CO_2$ and $N_2$. CBM may be present in a free state, sorbed state and/or in solution with water or liquid hydrocarbons. Free gas stored by compression (i.e., dictated by pressure and temperature conditions) may be present in both the primary and secondary porosity systems (defined below), though to a lesser degree than the sorbed gas. CBM solution gas that may be present, if any, will typically be a smaller percentage than sorbed CBM present in the coal bed.

"Fluid" means a liquid, gas, finely divided solids and combinations thereof that change shape or direction uniformly in response to an external force imposed on it.

"Stronger adsorbing gases or fluids" (collectively referred to herein as "SAG") are fluids having an atmospheric pressure boiling point greater than that of $CH_4$, i.e., greater than −164° C. Thus, as used herein, "weaker adsorbing gases or fluids" (collectively referred to herein as "WAG") are fluids having a boiling point less than that of $CH_4$, i.e., lower than −164° C.

Figure 1A:
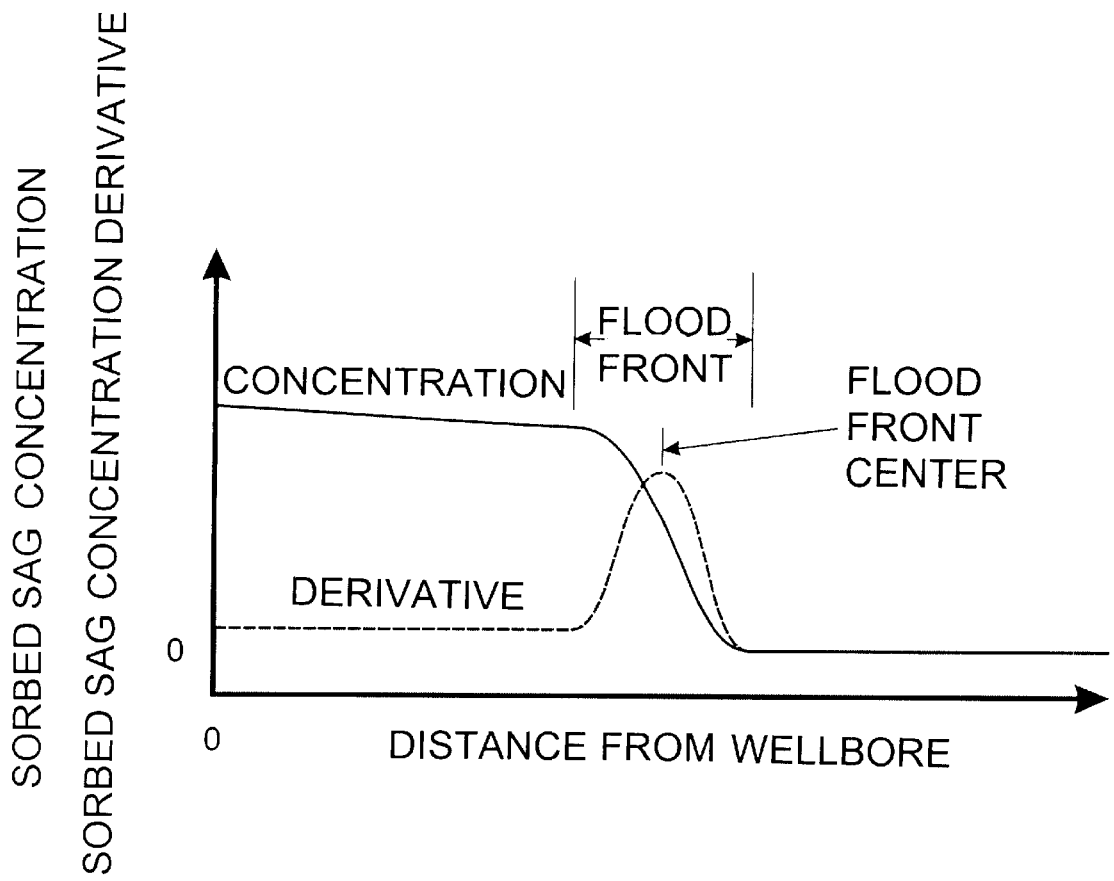
FIG. 1A illustrates an example for determining a flood front's center point as defined herein.

"Flood front" is a coal bed region having a sorbed SAG concentration gradient, between a leading boundary and a trailing boundary, in which region there is a significant difference between (a) the sorbed SAG concentration at the region's center point and (b) any other sorbed SAG concentration in the coal bed areas directly ahead and behind the leading and trailing boundaries, respectively. For purposes of this specification, the center point of a flood front's sorbed SAG concentration gradient is determined by locating the maximum of the sorbed SAG concentration derivative absolute value curve with respect to the distance from the injection well, whether or not that maximum is equidistant from the flood front's leading and trailing boundaries. For example, FIG. 1A illustrates the case where the flood front's center point happens to correspond to the inflection point of the sorbed SAG concentration curve and, therefore, is equidistant from the flood front's boundaries. Also, as shown in FIG. 1A, different SAG concentration gradients may be found ahead and behind the flood front.

Figure 1B:
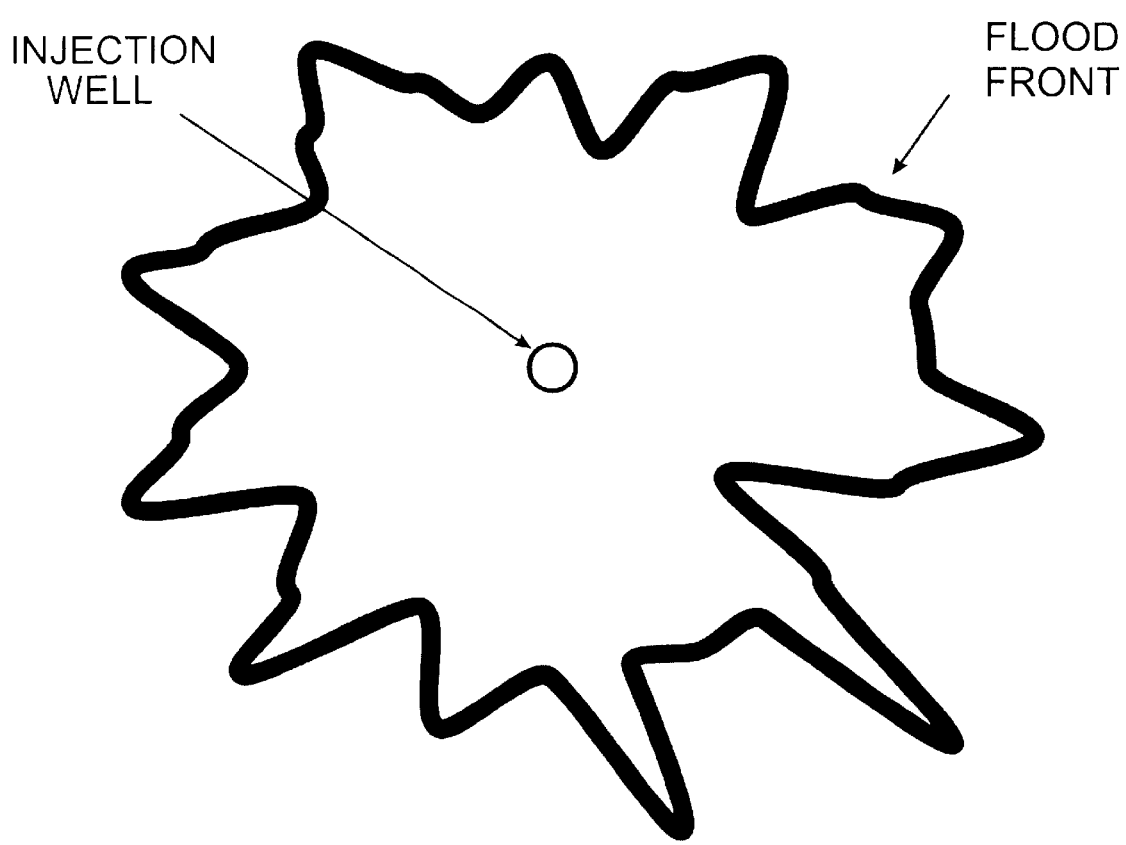
FIG. 1B is a top plan view of an example of a non-uniform flood front.

Furthermore, a flood front can shift within a coal bed. Generally, it will shift radially outward from an injection well, although not necessarily uniformly as shown in FIG. 1B, as increasing amounts of fluid comprising SAG are injected into the coal bed. The distance between the flood front's leading and trailing boundaries can change depending on a number of factors including, without limitation, injected gas composition, injection rate, injection time, and rate of SAG sorption. "Contacted-region-sorbed gas" is the total quantity of all sorbed gas including original in-situ CBM that remains sorbed plus additionally sorbed injected gas, after each injection cycle, in the portion of a coal bed contacted with an injected gas. While injected gas may disperse to some degree beyond the flood front, for the purposes of this specification, the contacted region is at or behind the flood front's center point.

"Porosity" in general is the ratio of the void volume within a material to the bulk volume of the material. There are two major subtypes of coal porosity, namely a primary porosity system and a secondary porosity system, each having two principal porosity subtypes:

A "primary porosity system" is comprised of micropores and mesopores resulting from natural coal-forming processes. Micropores are pores having a diameter less than about 2 nanometers (nm) (i.e., $2 \times 10^{-9}$ m). Mesopore diameters are in the range of from about 2 nm to about 50 nm. Isolated macropores can also form part of the primary porosity system, but are not usually considered a principal subtype of the primary porosity system. Isolated macropores have diameters in the range of from about 50 nm to about 1 mm and are not connected to other macropores or natural fractures (i.e., not substantially contributing to Darcy flow). Fluid transfer in the primary porosity system is primarily by diffusion, which usually obeys Fick's Law.

A "secondary porosity system" is comprised of interconnected macropores in the range of from about 50 nm to about 1 mm, and natural fractures that are generally less than about 1 mm in width. Natural fractures include cleats and joints, defined below. For purposes of the discussion herein, non-propped induced fractures can also form part of the secondary porosity system. Generally, the secondary porosity system provides the conduit for mass transfer to wells, by Darcy flow (i.e., fluid flow under a pressure gradient). "Permeability" is a rock property that quantifies the ability of a porous rock to transmit fluids through the rock due to a pressure gradient, which is the change in pressure along a flow path divided by the length of the flow path. Permeability is typically determined from pressure data, for example using core samples, and calculated from Darcy's Law based on pressure gradients, fluid properties and flow geometry. Increased permeability results in greater flow rates for a given pressure gradient. There are three different terms used to describe permeability: absolute, effective and relative.

"Absolute permeability" is the permeability that is determined when only one fluid is present in the coal. Typical commercial CBM reservoirs have an absolute permeability in the range of from about 1 to 25 md, but some CBM reservoirs may have an absolute permeability as great as about 200 md. Absolute permeability can be determined by a method like that described in Chapter 5 of Gas Research Institute Report GRI-94/0397 (Mavor, M. and Saulsberry, J. L. "Coalbed Methane Well Testing" in *A Guide to Coalbed Methane Reservoir Engineering* March 1996).

"Effective permeability" is the permeability of one fluid in the presence of one or more other fluids. If two different fluid phases are present, the vapor phase interferes with the liquid phase and vice versa. Two immiscible liquid phases (e.g., water and oil) can also interfere with each other. Accordingly, due to a fluid/fluid interference, the effective permeability is less than the absolute permeability. In coal, which has both gas and water present, the effective permeability is a function of gas and water saturation in the secondary porosity system. As used in the definition of effective permeability, "water saturation" is the ratio between the water volume and the void volume in the secondary porosity system and "gas saturation" is the ratio between the gas volume and the void volume in the secondary porosity system. Effective permeability can be determined by a method like that described in Johnson et al. ("Calculation of Relative Permeability from Displacement Experiments" *Trans. AIME* 216:370–372; 1959).

"Relative permeability" is the effective permeability divided by the absolute permeability.

"Impermeable" rock is a rock of such low permeability that it has little or no effect upon the fluid flow in adjacent permeable rock.

"Secondary porosity system compressibility" is the fractional change in volume of the secondary porosity system per unit pressure change in the secondary porosity system. For brevity, secondary porosity system compressibility will be referred to herein as "fracture compressibility," even though the secondary porosity system, as defined above, can also include interconnected macropores as well as fractures.

"Matrix compressibility" is the fractional change in coal matrix bulk volume per unit change in the pressure imposed on the coal matrix. The coal matrix includes, among other things, the primary porosity system, solid material and water, and is bounded by natural fractures.

"Cleats" are natural fractures in coal. Types of cleats include, without limitation, face cleats, butt cleats, and tertiary cleats. Face and butt cleats are the most common fractures observed in CBM reservoirs. Face and butt cleats are generally orthogonal or substantially orthogonal to each other and are generally perpendicular to bedding surfaces. Shorter length butt cleats terminate in longer length face cleats. Tertiary cleats commonly terminate in the face or butt cleats, indicating that they were formed later in time. Tertiary cleats provide increased connectivity between face and butt cleats and, thereby, increase the overall permeability of the cleat system.

"Joints" are larger scale fractures with inter-fracture spacing on the order of feet. Joints tend to have greater heights than cleats and can cut across lithotypes and coal/inorganic rock interbeds. Similar to tertiary cleats, joints can increase the overall fracture system connectivity and permeability, but on a much larger scale. Joints can also increase permeability in the vertical direction.

"Induced fractures" are fractures that are created by injecting or producing fluids into and/or from a coal bed. Induced fractures also include natural fractures whose length has been increased, with or without increasing the fracture's aperture.

"Fracture aperture" is the distance between the two coal matrix planes bounding a fracture, i.e., width.

"Fracture conductivity" is the product of absolute permeability and aperture of a natural or induced fracture.

"Reservoir pressure," $P_R$, means the average pressure of a well's drainage area at a specified depth. The reservoir pressure of the formation may change over time as fluid is injected into the formation and/or fluids are produced from the formation.

"Bottom-hole pressure," $P_w$, means the pressure at the same depth as the center point of the reservoir within the wellbore. Bottom-hole and reservoir pressure are usually specified at the same depth.

"Bottom-hole temperature" refers to the temperature at the same depth as the center point of the reservoir within the wellbore.

"Crack initiation pressure," $P_C$, means the pressure required to induce a fracture in unfractured rock.

"Fracture extension pressure," $P_E$, is the pressure required to extend an existing induced fracture and/or cleat. $P_E$ for a particular formation is less than $P_C$. $P_E$ can change during an injection, for example, without limitation, due to coal heterogeneity and pressure losses in an induced fracture. Accordingly, $P_E$ is often indicated by a pressure range.

"Fracture pressure," $P_F$, is equal to the minimum horizontal in-situ stress and is often referred to as closure stress and is commonly interpreted to mean the pressure required to initiate the opening of an existing natural or induced fracture. $P_F$ is less than $P_E$. Two reasons that $P_E$ is greater than $P_F$ are, without limitation, (1) friction between fracture surfaces and injected fluids and (2) fracture tip toughness, i.e. the proclivity for a material to resist failure by fracture extension.

"Injectivity" is an indicator of the relative ease with which a fluid is injected into a formation. Factors affecting injectivity of SAG into a coal bed include permeability, fracture conductivity, and secondary porosity. Injectivity is measured in m³/day-kPa or Mscf/day-psi and can be calculated using Equation (1) provided below.

General Discussion

In accordance with one aspect of the invention disclosed herein, CO$_2$ and other stronger adsorbing gases or fluids (SAG) are sequestered by injecting into a coal bed. And in accordance with another aspect of the invention, SAG injection can also be used in enhanced CBM recovery. Injecting a SAG not only maintains or increases reservoir pressure, thereby inducing a greater driving force for production, but also has the potential to produce CH$_4$ more effectively than pressure depletion methods.

Prior to the invention disclosed herein, it was generally believed that lower (i.e., ≦5 md) to moderately lower permeability (i.e., 5–10 md) CBM reservoirs would be difficult, if not economically impractical, to use for SAG/ECBM recovery processes. The problem the industry expects to face with trying to inject SAG into a lower or a moderately lower permeability reservoir, and optionally recover CBM when desired, arises from the reservoir's limited capacity to accept SAG without causing the reservoir to swell and thereby shutoff its secondary porosity system. Of course, as the coalbed swells, its secondary porosity system becomes restricted and/or closed, thereby reducing the reservoir's ability to support fluid flow. Hence the reservoir's permeability drops even lower and fluid flow in the reservoir becomes more restricted, requiring injection under higher pressure but at a lower iniectivity. Injectivity is injection rate divided by the bottom-hole/reservoir pressure differential (i.e., the difference between the bottom-hole injection pressure and reservoir pressure).

Therefore, using known conventional injection techniques in lower or moderately lower permeability reservoirs, the required injection pressure is so high and the injection rate is so low, thereby producing a low injectivity, that the sequestration and/or ECBM recovery process becomes uneconomic. Consequently, to make SAG injection into a lower permeability reservoir more economically practical, a method is required to increase injectivity so that SAG can be injected under a lower bottom-hole/reservoir pressure differential and/or higher injection rate.

Generally, such a method should overcome the problem of restricted fluid flow produced as the coal bed swells, which chokes the coal bed's porosity system in response to continued SAG injection. The method, disclosed more specifically below, which addresses the problem of SAG injection in a lower to moderately lower permeability reservoir, involves (a) fracturing the formation while controlling both the extent of formation damage to the coal bed and the extent of height growth beyond the coal bed and (b) cyclically injecting SAG with intervening shut-in periods. Surprisingly and unexpectedly, this method reduces SAG injection pressure and increases injectivity while providing significantly improved SAG sequestration and/or ECBM recovery.

Reservoir Characteristics

A higher permeability reservoir, such as located in the San Juan Basin production fairway (New Mexico and Colorado), typically has an absolute permeability greater than about 20 md. A moderate permeability reservoir has an absolute permeability in a range of from about 10 to about 20 md, while a moderately lower permeability reservoir has an absolute permeability in a range from 5 to 10 md and a lower permeability reservoir, such as the Mannville Formation in the Plains Region of Alberta, Canada, has an absolute permeability ≦ about 5 md. These ranges are summarized in Table 1.

TABLE 1

Categories of Coal Bed Absolute Permeability

| Category | Approx. Average Absolute Permeability Range (md) | Basin Example |
|---|---|---|
| Higher | ≧20 | San Juan Basin Fruitland Formation Production Fairway (New Mexico, Colorado) |
| Moderate | 10–20 | Warrior Basin Mary Lee Seams (Alabama) |
| Moderately Lower | 5–10 | |
| Lower | ≦5 | Manville Formation Medicine River Seams (Alberta, Canada) |

CBM reservoirs are inherently heterogeneous. Even within the San Juan Basin production fairway, there are lower permeability coal beds located vertically adjacent to higher permeability coal beds. The inventors have observed permeability data from wells having an absolute permeability an order of magnitude greater or less than data from wells just 100 meters apart. Accordingly, the absolute permeability ranges in Table 1 are provided as a guideline only.

Because primary production is expected to be significantly lower using conventional techniques in lower and moderately lower permeability reservoirs, ECBM production and SAG sequestration rates are also expected to be significantly lower in lower and moderately lower permeability reservoirs. Accordingly, most ECBM and SAG sequestration testing is conducted in moderate and higher permeability reservoirs.

Absolute permeability of the secondary porosity system can increase or decrease over the life of the reservoir by the coal bed shrinking or swelling, respectively. For example, absolute permeability can be increased by WAG injection or during primary production due to a net reduction in sorbed CBM content. On the other hand, absolute permeability is decreased by SAG sorption due to a net gain in sorbed SAG content with subsequent coal swelling or by reducing pore pressure during production. A 1% change in the coal bed's bulk volume can change the secondary porosity, by a factor of 2 or more, while the corresponding absolute permeability changes by a factor of 8 or more.

Accordingly, those skilled in the art have generally understood that SAG injection would further reduce permeability in an already lower or moderately lower permeability reservoir. Therefore, ECBM production and SAG sequestration tests are typically conducted in higher permeability reservoirs. But the process described herein can be applied to higher, moderate, moderately lower or lower permeability reservoirs.

Another factor related to coal bed permeability is the effect of adjacent rocks. In general, in a shallow coal bed (i.e., depth≦about 600 m), an induced fracture extends radially outward in a substantially horizontal plane and extends upward in a substantially vertical direction in deeper coal beds (i.e., depth≧about 600 m). Accordingly, when a deeper coal bed has an adjacent permeable rock above or below the coal bed, vertical fractures can extend into the adjacent rock and injected fluids can escape from the coal bed. Therefore, generally it is desirable to conduct SAG sequestration in coal beds where the adjacent rock is impermeable, so that the initial fracture stimulation and subsequent cyclic SAG injections are substantially confined to the coal bed. However, it is possible to sequester SAG when the adjacent non-coal rock is permeable if:

1. In the case of a production/sequestration process, the permeable rock does not extend from the injection to the production well, does not outcrop, and is not connected to permeable rocks that do outcrop; i.e., there are no pathways from the injection well to a production well or the atmosphere.
2. In the case of sequestration alone, if the permeable rock does not outcrop or is not connected to rocks that do outcrop.

It will be understood by those skilled in the art that there are a number of factors ffecting coal beds. Accordingly, the nature of a particular coal bed and its adjacent rocks ust be studied for their suitability to the initial fracture stimulation step preceding the cyclic AG injection/soak phase.

Drilling and Completion

A wellbore may be drilled using coal gas well drilling techniques known to those skilled in the art. Conventional techniques include, without limitation, air, air-mist, $N_2$, flue gas, water, natural mud and artificial mud drilling methods.

The wellbore is then completed in a manner known to those skilled in the art, including, without limitation, open-hole, open-hole cavitation, open-hole with perforated liners, cased-perforated, and cased-perforated-hydraulically fractured methods.

The process for sequestering SAG uses at least one wellbore. But when recovering $CH_4$ from the coal bed is also desired, there is at least one injection well and at least one production well.

Injection Well Stimulation

Following completion, the coal bed is stimulated from the injection well by injecting a fluid at a pressure greater than or equal (≧) to the crack initiation pressure, $P_C$. The pressure is subsequently reduced to ≧ the fracture extension pressure, $P_E$, but <$P_C$. By "stimulation," we mean that a new fracture is created or that an existing fracture is extended in length and/or aperture.

As noted above, $P_E$ is dependent on the coal bed formation's composition and depth. Moreover, the in-situ stress in a coal bed and adjacent non-coal formations has a strong influence on $P_E$. Generally, $P_E$ for a coal bed is equivalent to a gradient in a range of from about 20.6 to about 56.5 kPa/m (about 0.9 to about 2.5 psi/ft). For example, for coal beds at a depth of 914 m (3,000 ft), the bottom-hole pressure during stimulation can range from about 20,700 kpa(g) (3,000 psig) to about 51,700 kpa(g) (7,500 psig). However, the $P_E$ gradient in sandstone is about 16 kPa/m (0.7 psi/ft). Accordingly, when sandstone is located above or below a coal bed, an induced fracture can extend through the coal bed to the adjacent sandstone.

If the in-situ stress distribution is known, computer simulation models can be used by those skilled in the art to predict fracture stimulation behavior. One example of such a computer simulation model is TerraFrac™ available through TerraTek, Inc., Salt Lake City, Utah, USA. In-situ stresses can be measured, for example, by injecting a relatively small volume of fluid into a wellbore at high pressure while measuring the bottom-hole pressure. Alternatively, in-situ stresses can be estimated in a manner known to those skilled in the art, for example, from sonic log p-wave and s-wave measurements.

Two common problems encountered when stimulating coal beds with conventional hydraulic fracturing techniques, such as those suggested by Chaback et al. (U.S. Pat. Nos. 5,439,054 and 5,566,756), are formation damage to the coal and height growth of induced fractures above and below the coal bed of interest. One way the inventors have substantially overcome these problems while significantly improving injectivity is by using a relatively low proppant concentration and a relatively low proppant mass, injected at a relatively high injection rate for a relatively short time period.

For example, water having a low proppant concentration in a range from about 60 to about 240 kg/m³ (0.5 to 2 lb/gal) is pumped at a high rate in a range from about 6.7 to about 11 m³/min (40 to 66 barrels/min) for about 10 to about 30 minutes. The proppant mass per thickness is preferably in a range from about 1,063 to about 4,250 kg/m (710 to 2,850 lb/ft). This is in contrast to conventional hydraulic fracturing techniques where typical proppant concentration is 480 to 1,440 kg/m³ (4 to 12 lb/gal), proppant mass per thickness is 4,500 to 22,000 kg/m (3,000 to 15,000 lb/gal), injection rate is 3 to 8 m³/min (20 to 50 barrels/min) and injection time is 30 to 60 minutes.

Examples of suitable injection fluids include, without limitation, $CO_2$, flue gas, $N_2$, water, and combinations thereof. If desired, at sufficiently low concentrations, a non-cross-linked polymer may be added to the injection fluid to reduce fluid viscosity by virtue of reducing pumping friction that can arise when the injection fluid is pumped at higher rates. However, at significantly higher concentrations, the polymer may cause the coal to swell, thereby reducing permeability. If used, the polymer concentration is preferably in a range from about 1 to about 2 kg/m³ (0.01 to 0.02 lb/gal).

Proppants are often used in combination with an injection fluid to keep induced fractures substantially open and thereby enhance the formation's permeability during SAG injection and $CH_4$ production. Examples of suitable proppants include, without limitation, sand, sintered bauxite, and sintered ceramics. Preferably, proppants are well-sorted so that there is a relatively narrow particle size distribution.

Preferably, the proppant particle size distribution is in a range from about 1,700/850 μm (12/20 mesh) to about 425/212 μm (40/70 mesh). More preferably, the proppant particle size distribution is about 850/425 gm (20/40 mesh).

An example injection well stimulation summary for a 4-m (13-ft) thick coal seam is illustrated in Table 2. The proppant mass per unit thickness is 2,125 kg/m (1,425 lb/ft). The injection time is less than 15 minutes. Using the well stimulation parameters in Table 2, it is expected that the effective fracture length (the length that improves injectivity or productivity) will be relatively short (i.e., <about 10 m (30 ft)) and height growth out of the coal will be minimal (<about 2 m (6 ft)). In contrast, a conventional stimulation using the typical values mentioned above would result in an induced fracture length of about 46 to 76 m (150 to 250 ft) and height growth out of the coal could be tens of meters depending on the in-situ stress distribution

TABLE 2

| Stage | Elapsed Time (min) | Injection Rate (m³/min) | Liquid Volume (m³) | Proppant Concentration (kg/m³) | Proppant Mass (kg) |
|---|---|---|---|---|---|
| 1 | 6.67 | 10 | 66.7 | 0 | 0 |
| 2 | 1.67 | 10 | 16.7 | 60 | 1,000 |
| 3 | 1.67 | 10 | 16.7 | 90 | 1,500 |
| 4 | 1.67 | 10 | 16.7 | 120 | 2,000 |
| 5 | 1.67 | 10 | 16.7 | 240 | 4,000 |
| 6 | 1.33 | 10 | 13.3 | 0 | 0 |
| Total | 14.68 | | 146.8 | | 8,500 |

A stimulation treatment very similar to the Table 2 example was conducted at a site int the Plains Region of Alberta, Canada. The rock adjacent to the coal bed was impermeable shale. Iridium and scandium were used as radioactive tracers for the proppant and water, respectively, to determine fracture height. A radioactive logging tool was used to monitor the tracers. The tracer log was analyzed, indicating that proppant and water were injected into coal at a depth between 1,255 and 1,263 m (between 4,118 and 4,144 feet). Based on this tracer analysis, the induced fracture was contained within a region 4 m (13 ft) abobe the coal bed and 1 m (3 ft) below the coal bed. Although injected gas can pass through the induced fracture near the wellbore, it must eventually enter the coal bed becuse the gas cannot penetrate into the adjacent impermeable rock. Accordingly, this stimulation would be effective for supporting a subsequent cyclic SAG injection and soak phase of the process.

The Table 2 example illustrates a staged stimulation schedule with increasing proppant concentration. However, proppant can also be injected under a constant concentration schedule. In a constant concentration schedule, Stages 2 through 6 would become one stage with an average proppant concentration of 127 kg/m³.

Preferably, the first injection stage liquid volume is approximately equal to the total volume of the subsequent stages, excluding a final displacement stage. The final displacement stage volume is selected so that the proppant-laden fluid is not substantially displaced of the wellbore.

After the final displacement stage, the wellbore is preferably shut-in for a time sufficient to rig down fracturing equipment, remove excess proppant, if any, from the well, and/or install any new equipment required for the subsequent SAG injection and soak cycle. The post-stimulation shut-in time can range from several hours to months depending upon the time required to install surface injection facilities. During the post-stimulation shut-in, the pressure decreases from $P_E$ to $P_F$ relatively rapidly (several minutes) and then slowly to $P_R$ The time required to reach $P_R$ depends upon the secondary porosity system permeability and can be as much as several weeks in a lower permeability coal seam. Subsequent SAG injections are not affected by the post-stimulation bottom-hole pressure. Accordingly, it is not necessary to wait until the post-stimulation pressure falls to $P_R$.

Adsorption

After the stimulation/shut-in step, a SAG is injected into the wellbore. One method for determining whether a fluid would be a SAG is to compare the boiling point of the injection fluid relative to $CH_4$. The atmospheric pressure boiling point is believed to be a generally reliable indicator of the relative strength of fluid adsorption in a coal bed, i.e., the higher the boiling point, the greater the adsorption strength. For illustrative purposes, atmospheric pressure boiling points for a number of compounds of potential interest are listed in Table 3.

TABLE 3

| Component | Atmospheric Pressure Boiling Point (° C.) | Relative Strength |
|---|---|---|
| 1,1,2-trichloro-1,2,2-trifluoroethane ($CCl_2FCClF_2$) | 47.6 | ↑ Stronger |
| Sulfur Trioxide ($SO_3$) | 44.8 | Adsorbing |
| Trichlorofluoromethane ($CCl_3F$) | 23.7 | Fluids |
| Nitrogen Dioxide ($NO_2$) | 21.2 | |
| Dichloromonofluoromethane ($CHCL_2F$) | 8.9 | |
| Dichlorotetrafluoroethane ($CClF_2CClF_2$) | 3.6 | |
| Sulfur Dioxide ($SO_2$) | −10 | |

TABLE 3-continued

| Component | Atmospheric Pressure Boiling Point (° C.) | Relative Strength |
|---|---|---|
| Dichlorodifluoromethane ($CCl_2F_2$) | −29.8 | |
| Chloropentafluoroethane ($CClF_2CF_3$) | −37.7 | |
| Propane ($C_3H_8$) | −42.1 | |
| Hydrogen Sulfide ($H_2S$) | −60.7 | |
| Sulfur Hexafluoride ($SF_6$) | −63.8 | |
| Hexafluoroethane ($CF_3CH_3$) | −78.2 | |
| Carbon Dioxide ($CO_2$) | −78.5 | |
| Chlorotrifluoromethane ($CClF_3$) | −81.4 | |
| Fluoroform ($CHF_3$) | −84 | |
| Nitrous Oxide ($N_2O$) | −88.5 | |
| Ethane ($C_2H_6$) | −88.6 | |
| Xenon (Xe) | −107.1 | |
| Tetrafluoromethane ($CF_4$) | −128 | |
| Nitric Oxide (NO) | −151.8 | |
| Methane ($CH_4$) | −164 | Methane |
| Oxygen ($O_2$) | −183.0 | Weaker |
| Argon (Ar) | −185.7 | Adsorbing |
| Carbon Monoxide (CO) | −191.5 | Fluids |
| Nitrogen ($N_2$) | −195.8 | ↓ |
| Hydrogen ($H_2$) | −252.8 | |
| Helium (He) | −268.9 | |

As used herein, fluids with atmospheric boiling points less than that of $CH_4$, i.e. less than about −164° C. are believed to be weaker adsorbing fluids, while those with atmospheric boiling points greater than that of $CH_4$, i.e. greater than about −164° C. are believed to be stronger adsorbing fluids. For example, helium is considered relatively non-adsorptive in coal and it has the lowest boiling point of the compounds listed in Table 3.

In general, the sorption capacity of coal increases with pressure, depth and coal rank. For example, for a given depth and a similar reservoir pressure, anthracite generally has a greater sorption capacity than low-volatile bituminous coal, which, in turn, has a greater sorption capacity than medium-volatile bituminous coal and high-volatile bituminous coal.

$CO_2$ reduces the absolute permeability of a coal bed by swelling. Based on the relative adsorption strength in Table 3, the inventors expect that other SAGs, for example $H_2S$, having a higher atmospheric pressure boiling point and, therefore, a stronger adsorption strength, will swell coal to a greater degree than is caused by adsorption of an equal volume of $CO_2$. Therefore, the absolute permeability reduction caused by injecting $H_2S$ is expected to be greater than that caused by injecting an equal volume of $CO_2$.

Often, though not always, the secondary porosity system in a coal bed is filled or nearly filled with water. In such a case, it may be preferable to produce an amount of water, prior to SAG injection, sufficient to achieve the appropriate effective permeability to gas for obtaining desired gas injectivity.

Thus, suitable SAGs for injection in the process of the present invention are fluids comprising one or more compounds having a boiling point greater than that of $CH_4$, including, without limitation, $CO_2$, NO, $SF_6$, $H_2S$, $SO_2$, $NO_2$, $SO_3$, $CCl_3F$, $CHCl_2F$, $CClF_3$, $CF_4$, $CHCl_2F$, $CHF_3$, $CCl_2FCClF_2$, $CClF_2CClF_2$, $CF_3CH_3$, $CClF_2CF_3$, and combinations there of.

It will be understood that some fluids can be injected as liquids, for example liquid $CO_2$ and $H_2S$, but may vaporize under wellbore and/or formation conditions. Other fluids will stay in the same phase after injection. For example, $H_2S$ injected in a liquid state does not necessarily vaporize in the coal bed.

Mixtures of SAGs may include one or more WAGs. However, the total SAG content in a mixture is preferably greater than 40% (vol.). At higher WAG contents, compression requirements may become too costly because more energy is required to compress WAG. Also, because WAG is weakly adsorbing, WAG may breakthrough to a production well, if a production well exists. More preferably, the total SAG content is greater than 50% (vol.). Most preferably, the total SAG content is greater than 60% (vol.).

Sources of $CO_2$ include flue gas effluent from, for example, without limitation, power plants or internal combustion engines. Flue gases typically contain from about 13 to about 20% $CO_2$ and require treatment to increase the $CO_2$ concentration to at least about 50%.

An example of a $H_2S$ source is a gas-treating plant that removes $H_2S$ from natural gas prior to sale. Such an effluent is often a mixture of $H_2S$ and $CO_2$ containing from about 5% to about 95% $H_2S$.

Injection

After the stimulation/shut-in step, a SAG is cyclically injected into the wellbore to enhance SAG sorption, at pressures greater than $P_R$ but less than $P_F$ or $P_E$. It is known that SAG sorption causes coal swelling, which reduces the coal bed's absolute permeability. As discussed above, prior to the inventors' discovery, it has been understood that SAG injectivity would be significantly lowered because of the reduced permeability. Therefore, it has generally been understood that injection into lower to moderately lower permeability coal beds would necessarily require high pressures, which would exceed $P_F$ or even $P_E$. However, injection at or exceeding $P_F$ or $P_E$ is generally avoided in both SAG sequestration and ECBM operations, due to uncontrolled fracture growth and high compression expenses.

Surprisingly and unexpectedly, the inventors discovered that SAG injectivity increases using a cyclic SAG injection/shut-in process, even though absolute permeability decreases with continued SAG sorption. Moreover, using the process described herein, SAG can be more effectively injected into a lower permeability reservoir at pressures less than $P_F$.

The increased injectivity is thought to be due to a reduction in near-well flow resistance as compared to the near-well flow resistance of the original rock prior to being altered by well stimulation and/or gas sorption/desorption. This reduction in near-well flow resistance could be explained by an increase in the apparent fracture length at <$P_F$. Without being bound by theory, explanations for the increased apparent fracture length include, without limitation, (1) making more effective use of the existing fracture length by ballooning (i.e., increasing aperture) along at least a portion of the fracture, (2) making more effective use of the existing fracture length by some other mechanism, (3) actually increasing the fracture's length, or (4) some combination thereof.

For convenience of discussion, the reduction in near-well flow resistance is explained by referring to increases in "apparent" fracture length. Nonetheless, it should be understood that reference to the "apparent" fracture length and the mechanisms proposed for explaining its increase, whether for more effective use of existing fracture length, increasing actual fracture length or a combination thereof, are strictly provided to assist in better illustrating the surprising and unexpected nature of inventors' discovery. Accordingly, while these theoretical discussions are subject to change, the claimed invention will remain unchanged, despite additional or alternative theoretical explanations that may be developed in view of new information or other experimental work beyond the scope of this specification.

The surprising and unexpected discovery that SAG infectivity increases using a cyclic SAG injection/shut-in process, is based, in part, on analysis of pressure data and skin factor measurements presented in the Example below.

Injectivity is inversely related to skin factor, which is the restriction, if any, to fluid flow through a reservoir in the near wellbore vicinity. This can be envisioned as a choke in a pipe. As discussed above, coal's near-well absolute permeability affects the skin factor, which in turn affects fluid flow. Also, the presence of an induced fracture can overcome permeability reduction. Therefore, those skilled in the art understand the relative effect of these two parameters on skin factor and injectivity to be as shown in Rows 1–4 of Table 4, which first shows the independent effects of decreasing absolute permeability and increasing fracture length. Table 4 also shows the generally understood effect caused by SAG injection at >$P_E$ (where fracture lengths are extended) and <$P_E$ (where fracture lengths are substantially constant). Row 5 shows how the cyclic SAG injection/soak process described herein is contra to the generally understood effect of SAG injection at <$P_E$. As discussed above, however, the decreased skin factor in Row 5 is believed to be due to an increased apparent fracture length, by (1) making more effective use of the existing fracture lenghth by ballooning, (2) making more effective use of the existing fracture length by some other mechanism, (3) actually increasing the fracture's length, or (4) some combination thereof.

TABLE 4

| | Process | Absolute Permeability | Fracture Length | Skin Factor | Injectivity |
|---|---|---|---|---|---|
| 1 | SAG Sorption | ↓ | Constant | ↑ | ↓ |
| 2 | Fracture Length | Constant | ↑ | ↓ | ↑ |
| 3 | SAG Injection at >$P_E$ | ↓ | ↑ | ↓ | ↑ |
| 4 | SAG Injection at <$P_E$ | ↓ | Constant | ↑ | ↓ |
| 5 | Cyclic SAG Injection/Soak at <$P_F$ | ↓ | ↑ (Apparent) | ↓ | ↑ |

So, when fluid flows through an induced fracture in a reservoir, the skin factor decreases with increased fracture length, since fluid flows more easily in an induced fracture. Therefore, at injection pressures below $P_E$ (which would not increase fracture length) it has been understood, by those skilled in the art, that the skin factor would remain substantially unchanged when absolute permeability is constant. With continued SAG sorption, which reduces a coal bed's absolute permeability, the skin factor would be expected to increase whether or not induced fractures are present. In contrast, however, by using the inventors' novel process, the skin factor is reduced, despite a decrease in the coal bed's permeability, while also using pressures below fracture extension pressure (i.e., <$P_E$). Therefore, an increase in infectivity using the cyclic SAG injection/soak process at <$P_E$ produced a surprising and unexpected result.

Injectivity is an indicator of the relative ease with which a fluid is injected into a formation, and can be calculated from pressure data as a function of the bottom-hole/reservoir pressure differential according to Equation (1):

$$i = \frac{q_{gi}}{P_w - \overline{P}} \quad (1)$$

where:
  i gas infectivity, m³/day-kPa or Mscf/day-psi
  $q_{gi}$ gas injection rate, m³/day or Mscf/day
  $P_w$ bottom-hole injection pressure, kPa(a) or psia
  $\overline{P}$ average injection zone pressure, kPa(a) or psia While injection rate is a parameter in Equation (1), it has generally been understood by those skilled in the art that injectivity does not increase with increased injection rates because injection rate changes are understood to be offset by proportional changes in the bottom-hole/reservoir pressure differential.

Injectivity can also be estimated as a function of formation and gas properties, including, among others, skin effect, which is quantified by skin factor, s, in Equation (2):

$$i = C \frac{k_g h}{\mu_g B_g \left[\ln\left(\frac{r_d}{r_w}\right) + s\right]} \quad (2)$$

where:
  C unit conversion constant, m³-Pa·s/day-kPa-md-m or Mscf-cp/day-psi-md-ft
  $k_g$ effective permeability to gas, md
  h injection zone thickness, m or ft
  $\mu_g$ gas viscosity at the average pressure, Pa·s or cp
  $B_g$ gas formation volume factor, (reservoir volume)/(surface volume), dimensionless
  $r_d$ equivalent steady state drainage radius, m or ft
  $r_w$ wellbore radius, m or ft
  s skin factor, dimensionless It is also generally understood that $r_d$ in Equation (2) increases with time until the area influenced by injection stabilizes. Accordingly, infectivity, calculated according to Equation (2), has generally been understood to decrease with time until the injection area stabilizes. By contrast, the inventors discovered that injectivity increased with time, despite a concurrent permeability reduction.

Equations (3) and (4) are used to calculate s where there is no induced fracture and where there is an induced fracture, respectively. Both equations are functions of the ratio of original to modified effective permeability to gas.

The relationship between s, the degree to which the permeability in the region is modified, and the radius of the reduced permeability region is described in Equation (3). Equation (3) assumes that there is no induced fracture and the reduced permeability region is substantially circular around the wellbore.

$$s = \left(\frac{k_g}{k_m} - 1\right)\ln\left(\frac{r_m}{r_w}\right) \quad (3)$$

where:
  $k_g$ original effective permeability to gas, md
  $k_m$ effective permeability to gas in the modified permeability region, md
  $r_m$ radius of the modified permeability region around the wellbore, m or ft
  $r_w$ wellbore radius, m or ft Where there is an induced fracture, s is calculated according to Equation (4), which assumes an oblong region around the fracture with the wellbore at the center.

$$s = \frac{\pi}{2} \frac{w_m}{x_f}\left(\frac{k_g}{k_m} - 1\right) - \ln\left(\frac{x_f}{2r_w}\right) \quad (4)$$

where:

$w_m$ width of the modified permeability region, m or ft $X_f$ fracture length, wellbore to tip, m or ft Accordingly, it has generally been understood that s does not decrease with time unless the pressure exceeds fracture extension pressure ($P_E$), especially as coal swelling occurs, as shown in Row 3 of Table 4.

In Equation (4), s is affected by the fracture length, $X_f$. Prior to the inventors' discovery, it was understood by those skilled in the art that, while permeability is constant or decreasing, s does not decrease with time unless $X_f$ is increased by injecting at $P_E$ or greater, as shown in Rows 2 and 3 of Table 4, respectively. As illustrated in Row 4 of Table 4, it was generally believed that if the SAG injection pressure is less than $P_E$, S increases with time, as absolute permeability decreases, because $X_f$ does not change. Surprisingly and unexpectedly, the inventors found that s can be reduced without exceeding $P_E$ or even $P_F$, as illustrated in Row 5 of Table 4. The decreased skin factor, corresponding to an apparent increase in $X_f$, increases injectivity over time, even though absolute permeability decreases over time.

As indicated previously, skin factor is an estimate of excess near-well flow resistance, so when the skin factor is zero, there is no excess near-well flow resistance (i.e., choking effect in the near-wellbore region) beyond that caused by the original, unaltered rock itself. Accordingly, when s=0, the coal bed accepts injected fluids at a rate that is controlled by bottom-hole/reservoir pressure differential, effective permeability to gas, reservoir thickness and the fluid properties.

A positive s indicates that the formation is damaged and/or its near-well permeability has been reduced by SAG injection. Therefore, a positive s would mean a lower injectivity, since a lower injectivity would be expected from a reduced permeability and/or a damaged formation. Hence, a negative s would indicate a higher injectivity would be obtained. The quantitative relation between injectivity and s is defined by Equation (2).

Accordingly, those skilled in the art had expected that s would be a positive number when SAG was injected in the coal bed since the coal bed's permeability would be substantially reduced by swelling with SAG sorption. Therefore, injectivity, as calculated using Equation (2), would be reduced. However, the inventors discovered that with their cyclic SAG/soak process s is a negative number, even though the absolute permeability decreases with SAG sorption. Also, the bottom-hole/reservoir pressure differential decreases and injectivity increases with time. Moreover, the inventors discovered that the apparent fracture length increases without exceeding injection pressures beyond either $P_F$ or $P_E$.

Furthermore, prior to the inventors' discovery, those skilled in the art generally believed that injectivity was not affected by injection rate. However, the inventors found that injectivity appears to increase with injection rate. The inventors believe that higher injection rates result in lower skin factor values and greater apparent fracture lengths, based, in part, on pressure data analysis discussed in more detail in the Example below. Accord ingly, SAG can travel farther through the coal bed, allowing greater injectivity and increased sequestration. While the actual fracture length was not measured, the increase in the calculated apparent fracture length may be due to (1) making more effective use of the existing fracture length by ballooning, (2) making more effective use of the existing fracture length by some other mechanism, (3) actually increasing the fracture's length, or (4) some combination thereof. However, without being bound by theory, because the injection pressure did not exceed $P_F$ or $P_E$, it is believed that the $1^{st}$ premise is more likely and that the cyclic SAG injection/soak process makes more effective use of fractures created by fracture stimulation of the injection well and the existing fracture system by ballooning.

Thus, contrary to the expectations of those skilled in the art, SAG can be injected at pressures less than $P_F$ and $P_E$, even in lower and moderately lower permeability coal beds. Accordingly, SAG injection pressures are preferably $>P_R$, but $<P_F$. However, SAG may be injected at a pressure exceeding $P_F$ or even $P_E$ for one or more injection stages, in any order, if desired. Alternatively, SAG may be injected at a pressure exceeding $P_F$ or even $P_E$ for a portion of one or more injection stages, in any order. In subsequent SAG injection stages, SAG is gradually sorbed further from the wellbore. In this way, sorption sites are occupied closest to the wellbore first and then outwardly from the wellbore.

Ballooning

As mentioned above, ballooning of the fracture's aperture is one theory for the increased apparent fracture length surprisingly and unexpectedly discovered by the inventors.

There are two basic mechanisms, which inevitably interact with each other, to affect the size of a fracture's aperture. One mechanism relates to changing the pressure in the coal bed's secondary porosity system, while a second mechanism relates to coal's ability to swell or shrink with gas adsorption or desorption, respectively.

As the pressure in the secondary porosity system increases, the aperture can be increased, while reductions in pressure result in reduced aperture. The extent of aperture change per unit pressure change in the secondary porosity system will substantially be a function of the coal bed's fracture compressibility, which in turn depends on the inherent properties of the coal bed.

Also, as a fluid is injected into a coal bed, the fluid, depending on its chemical composition, will have a tendency to be adsorbed into the coal matrix. Of course, SAGs have a greater tendency to increase a coal's swelling. But it is also believed that adsorbed SAGs, such as $CO_2$, can also weaken the coal matrix as more SAG is adsorbed into the matrix. This weakening makes the coal matrix more sensitive to pressure changes outside the matrix, such as, for example, increased pressure in the secondary porosity system. The extent of aperture changes per unit pressure change in the region outside the coal matrix will substantially be a function of the coal bed's matrix compressibility, which depends on the inherent properties of the coal bed in response to the type and volume of SAG adsorbed in the coal matrix. During shut-in periods, the pressure outside the coal matrix decreases, which allows the swelling coal matrix to reduce fracture apertures (i.e., the secondary porosity system is constricted). But, during injection periods, the increased pressure inside the fractures causes the fractures to balloon (i.e., the secondary porosity system expands). This ballooning overcomes coal matrix swelling by compressing portions of the weakened matrix, so that the coal matrix volume is restored substantially or reduced below its original volume. Consequently, despite periodic swelling in the coal matrix, injection is still possible.

One way to view this interaction between secondary porosity system pressure effects versus coal swelling effects on aperture size is by considering a ballooning expansion and constriction process, where the balloon is surrounded by a substantially resilient solid material. So, an increase in aperture size can be envisioned as blowing a gas, such as SAG, into a balloon, and more specifically, as expanding a balloon with a high aspect ratio (e.g., a "hot dog" type balloon). As the pressure in the high aspect ratio balloon increases, the balloon expands first at one end and then progressively along the balloon's longitudinal axis (i.e., the fracture axis). This process can be envisioned as expanding the fracture's aperture. Meanwhile, the walls of the balloon apply a compression force on the substantially resilient solid material, i.e. the coal matrix, surrounding the balloon, while gas is blown into the balloon, thereby compressing the coal matrix and restricting the balloon's expansion to some degree. Because the walls of the balloon are fluid permeable, when SAG is the injected gas, much of the SAG that permeates the balloon is sorbed by the coal matrix, weakening the coal matrix and its resistance to the balloon's expansion, making it more sensitive to the balloon's compression force. But, when gas is no longer blown into the balloon, the gas leaks out of the balloon, balloon pressure is reduced, and the compression force on the coal matrix is reduced accordingly. The coal matrix, although weakened by SAG sorption, will nonetheless swell, thereby constricting the balloon under lower pressure. As the matrix continues to swell, the balloon constricts accordingly. Finally, the balloon constricts to a volume smaller than its original volume (i.e., the secondary porosity system is constricted) and the coal matrix's volume is larger due to swelling.

It is generally understood and accepted that the coal bed's bulk volume is relatively constant, since substantially less compressible rock formations surrounding the coal bed will keep the bulk volume of the coal bed from expanding. The bulk volume of the coal bed is comprised of both fractures (i.e., balloons) and the coal matrix. Therefore, perhaps a relatively constant bulk volume could be obtained where the volume of some fractures (i.e., balloons) increase, while the volume of other fractures decrease. In any event, however, the ballooning/swelling process in a coal bed is primarily a dynamic process. So, in a cyclic injection/soak process, ballooning overcomes matrix swelling while injecting, but, when injection ceases, the balloon pressure drops and the swollen matrix tends to shrink the secondary porosity system.

Reservoir Temperature

Some investigators have suggested increasing the temperature in the reservoir by injecting hot gases, for example, as discussed in Wilson et al. (U.S. Pat. No. 5,402,847), to increase permeability by evaporating water and increasing CBM desorption. However, SAG storage capacity decreases with increasing temperature. Therefore, to maximize the reservoir's sequestration capacity, the temperature in the reservoir preferably should be maintained as near to the original temperature as possible.

Due to the mass and thermal capacity of water-saturated rocks, temperature in the reservoir does not change at a significant distance from the injection well except when injection times are on the order of years or when injection temperatures are dramatically different from the original temperature, such as during steam floods. However, closer to the well, the temperature in the reservoir approaches bottom-hole injection temperature. Bottom-hole injection temperature is dependent on injection rate, the wellhead injection temperature, and depth. A low injection rate will result in bottom-hole temperatures that are similar to temperature in the reservoir in many cases, except for shallow coal beds. A high injection rate may result in a bottom-hole injection temperature greater or lesser than the temperature in the reservoir depending on whether the SAG is at a higher or lower temperature, respectively.

The wellhead injection temperature of the SAG will depend on the source and any compression or treatments. For example, the temperature of power plant flue gas compressed and treated at the power plant, with little or no compression at the injection site, will be at about ambient temperature. If the SAG is compressed at the injection site, it is preferably treated to remove water and compressor oil prior to injection. Water removal typically involves cooling the SAG so that the injection temperature is about ambient temperature or slightly greater. If the compressed SAG is not cooled prior to injection, the injection temperature is in a range of from about 93° C. (200° F.) to about 204° C. (400° F.). Preferably, SAG is cooled to near ambient temperature after compression but before injection into the reservoir.

SAG is preferably injected at a surface injection temperature in the range of from about 4° C. (40° F.) to about 90° C. (200° F.). More preferably, the surface injection temperature is in a range of from about 10° C. (50° F.) to about 65° C. (150° F). Most preferably, the surface injection temperature is in a range of from about 15° C. (60° F.) to about 35° C. (100° F.).

Shut-In

As noted above, after each SAG injection stage, the wellbore is shut-in to improve SAG sorption into the primary porosity system. During shut-in, the pressure and SAG concentration in the secondary porosity system decreases as the SAG sorbs into the primary porosity system. In addition, the SAG concentration in the secondary porosity system decreases as it mixes with desorbed CBM.

The length of the shut-in period depends upon coal diffusivity, which is typically determined by measurement of the gas volume released from freshly cut coal samples as a function of time. Diffusivity is inversely proportional to sorption time, $T_s$, which is defined as the time required to release 63% of the gas from a coal sample maintained at constant temperature. Accordingly, the higher the diffusivity, the shorter the sorption time. Gas Institute Report GRI-97/0263 (Mavor et al. "Coalbed Reservoir Gas-in-Place Analysis" pg. 3.1–3.20; 1997) describes diffusivity measurement techniques. Factors affecting diffusivity include coal composition, temperature, and water content.

Diffusivity tests do not distinguish between gases but the inventors believe that different gases would provide different diffusivity values. Accordingly, as used herein, $T_{S-CBM}$ is the sorption time determined from original in-situ CBM at reservoir temperature and $T_{S-SAG}$ is the sorption time for the SAG at reservoir temperature. It will be apparent to those skilled in the art that the method described in GRI-07/0263 (ibid) can be used to determine $T_{S-SAG}$ by saturating a sample with SAG and measuring the time required to release 63% of the SAG from a coal sample maintained at reservoir temperature. But, nonetheless, $T_{S-CBM}$ may be used as a first order approximation of $T_{S-SAG}$ for developing a preliminary estimate of soak time, when time and/or resources for determining $T_{S-SAG}$ are not immediately available.

Typical coal bed sorption times for CBM are in a range of from about 3 to about 500 hours when measured at reservoir temperature.

Preferably, the shut-in stage is conducted for at least $0.5T_{S-SAG}$. More preferably, the shut-in stage is in a range from about $0.5T_{S-SAG}$ to about $4T_{S-SAG}$. Most preferably, the shut-in stage is in a range from about $T_{S-SAG}$ to about $2T_{S-SAG}$. However, successive shut-in times do not have to be equal. Shut-in times exceeding $4T_{S-SAG}$ would not compromise the technical benefits of the cyclic process but could affect the economics of the process depending on the extent of excess shut-in time.

Also, any regimen of alternating injection stage and shut-in periods may be used. For example, in one embodiment, each shut-in period is conducted for substantially similar shut-in time periods. In another embodiment, successive shut-in periods may be longer or shorter than the previous shut-in. In still another embodiment, a first series of shut-in stages, with intervening injection stages, may be substantially the same length of time, while each successive series of shut-in stages, with intervening injection stages, may also be substantially similar, but longer or shorter that the shut-in stages of the previous series.

Injection Time

The optimum injection time is selected to reduce the extent to which injected SAG is dispersed beyond the SAG flood front. Flood fronts are generally well-defined when SAG is injected into lower $T_{S-SAG}$ reservoirs and tend to be relatively narrow. In higher $T_{S-SAG}$ reservoirs, the flood front will tend to be wider with a more gradual change in sorbed SAG concentration. Also, while a flood front may be substantially circular or elliptically-shaped in a homogeneous coal bed, the flood front in a heterogeneous coal bed may be affected by, among other factors, localized permeability and coal property variations, resulting in an irregular shape, as illustrated in FIG. 1B.

As discussed in more detail below, the optimum injection time will depend on a number of factors, including $T_{S-SAG}$. For example, for the same injection time and volume, SAG will tend to travel further before being sorbed in a higher $T_{S-SAG}$ coal bed than in a lower $T_{S-SAG}$ coal bed since SAG will be sorbed more quickly in the lower $T_{S-SAG}$ coal bed. Therefore, SAG is preferably injected so that the sorbed SAG concentration, after each injection cycle, is at least about 50% of the contacted-region-sorbed gas. More preferably, the sorbed SAG concentration after each injection cycle is at least about 65% of the contacted-region-sorbed gas. And most preferably, the sorbed SAG concentration after each injection cycle is at least about 80% of the contacted-region-sorbed gas.

Generally, the first injection cycle can roughly range from as low as about 15 minutes to as long as 1 year. Of course, for the reasons stated above, the appropriate injection time within this range will be selected in view of the injection gas $T_{S-SAG}$, as well as other reservoir properties and operating parameters, and will be based substantially on ensuring that the injected SAG does not disperse significantly beyond the SAG flood front. The desired injection time and volume is generally inversely proportional to $T_{S-SAG}$. Consequently, in the range of possible injection times and with all other factors being constant, lower injection times should be used in higher $T_{S-SAG}$ coal beds, and higher injection times should be used in lower $T_{S-SAG}$ coal beds (i.e., the magnitude of the injection time is inversely related the magnitude of $T_{S-SAG}$ for the injected gas).

Using shorter injection times in higher $T_{S-SAG}$ coal beds, increases the sorbed SAG concentration in the SAG-contacted portion of the coal bed, so that the injected SAG becomes a higher percentage of the contacted-region-sorbed gas, other reservoir properties and operating parameters being constant. Accordingly, dispersion of SAG beyond the flood front is reduced.

In addition to sorption time, other reservoir properties and operating parameters must be considered to more accurately determine the appropriate injection time so that a higher percentage of the contacted-region-sorbed gas is the injected SAG. These other factors include, without limitation, coal bed thickness, the magnitude of the secondary porosity system's porosity, sorption capacity of the coal matrix for the injected SAG, volume of current SAG injection, injection rate for current SAG injection, the number of previous SAG injection/soak cycles, and SAG volume injected in previous cycles.

Generally, although not always, the injection time for successive cycles will require longer injection times than the $1^{st}$ cycle, assuming a relatively constant injection rate for each cycle. These progressively longer injection times are generally required to inject progressively larger volumes of SAG because, as the SAG front moves radially out from the injection well, for example, as depicted in FIG. 1B, a larger volume of the reservoir is contacted by SAG.

In the process of the present invention, after the initial well stimulation/shut-in step, each SAG injection stage is alternated with a shut-in stage. Any regimen of alternating injection stage and shut-in period sequences may be used. For example, in one embodiment, each SAG injection stage is conducted for substantially similar injection times. In another embodiment, successive SAG injection stages may be longer or shorter than the previous injection. In still another embodiment, a first series of injection stages, with intervening shut-in periods, may be substantially the same length of time, while each successive series of injection stages, with intervening shut-in periods, may also be substantially similar, but longer or shorter than the injection stages of the previous series.

Methane Production

The SAG sequestration technique described above may be conducted with or without CBM production. Preferably, the SAG sequestration is conducted with CBM production. In this way, revenues from CBM production can offset costs for sequestering SAG.

When $CH_4$ production from a coal bed is desired, whether concurrent SAG sequestration is desired or not, there must be at least one injection well and at least one production well. $CH_4$ can be recovered by means and methods well known to those skilled in the art.

There is often a minimum heating value and maximum contaminant level for commercial $CH_4$ sales. Accordingly, SAG and/or WAG removal may be required, depending on the type of SAG or WAG and the concentration thereof in the produced CBM. SAG and WAG are removed by means and methods known to those skilled in the art. For example, $CO_2$ (a SAG) may be removed by an amine separation and $N_2$ (a WAG) may be removed with a cryogenic process.

Water production is a significant difference between coal and conventional natural gas reservoirs because conventional gas reservoirs rarely produce water unless the water enters the wellbore from an adjacent aquifer. Conventional natural gas formations commonly begin production at maximum gas rate, which then declines with depletion. When water production becomes significant, the well is often shut-in or abandoned because of the added cost to separate water and gas. By contrast, when water production from a coal reservoir occurs, it is done before and concurrent with CBM production.

Often, though not always, at the time of first production from a coal reservoir, the secondary porosity system is found filled or nearly filled with water. In such a case, this water must be produced from the secondary porosity system first to allow sorbed CBM to be released from the primary porosity system. Water production decreases the water saturation in the secondary porosity system, which, in turn, reduces relative and effective permeabilities to water while the permeabilities to gas are increased. The reduction in the water saturation causes CBM production rates to increase early in the life of the well. Eventually, the water saturation in the secondary porosity system reaches a relatively constant value and the CBM production rates decline accordingly as the primary porosity system is depleted of CBM.

In the case where water production occurs, artificial lift methods, known to those skilled in the art of CBM production, can be used. Some examples of such artificial lift methods include, without limitation, rod pumps, progressive cavity pumps, electrical submersible pumps, gas lift and plunger lift equipment.

The following non-limiting example of embodiments of the present invention that may be made and used as claimed herein are provided for illustrative purposes only.

EXAMPLE

This example shows the effect of cyclically injecting a SAG, specifically $CO_2$, into a coal bed with intervening soak periods. After the initial injection well stimulation, all $CO_2$ injections were conducted at $<P_F$. The absolute permeability decreased, as expected, from 3.6 md to 1.0 md after 12 SAG injections (15 metric tons each), representing an absolute permeability reduction of 72%. Surprisingly and unexpectedly, the inventors discovered that injectivity increased through the 12 $CO_2$ injections, even though the absolute permeability decreased. The increased injectivity is believed to be due to an increase in apparent fracture length, even though the cyclic $CO_2$ injections were conducted well below fracture extension pressure, $P_E$, and below fracture pressure, $P_F$.

This test was conducted in the Mannville Formation CBM well FBV 4A-23-36-20 W4M (FBV 4A) located 3 km north of Big Valley, Alberta, Canada. The well was completed in a 4-m (13-ft) thick coal bed at a depth of 1,265 m (4,150 ft). The reservoir temperature was 47° C. (117° F.) and the initial reservoir pressure was 7,900 kpa(g) (1,146 psig).

The coal's initial absolute permeability was 3.6 md and the initial effective permeability to gas was 0.53 md, as determined by well testing techniques such as described in Chapter 5 of Gas Research Institute Report GRI-94/0397 (Mavor, M. and Saulsberry, J. L. "Coalbed Methane Well Testing" in *A Guide to Coalbed Methane Reservoir Engineering;* March 1996). Accordingly, the Mannville coal is considered a lower permeability reservoir. The adjacent rock was impermeable. The sorption time, $T_{S-CBM}$, was 4.93 hours, determined by measuring diffusivity as described in GRI-97/0263 (ibid).

Well Stimulation

The injection well was stimulated by hydraulic fracturing using a mixture Of $CO_2$ and proppant. The proppant was a 20/40 mesh sand. A summary of the well stimulation step is presented in Table 5.

TABLE 5

| Time (min) | Liquid $CO_2$ Volume (m³) | $CO_2$ Pump Rate (m³/min) | Proppant Concentration (kg/m³) | Incremental Proppant Mass (kg) | Surface Pressure (MPa (g)) |
|---|---|---|---|---|---|
| 6.1 | 40 | 8.6–8.8 | 0 | 0 | 20.4 |
| 8.1 | 60 | 8.3–8.6 | 50 | 1,000 | 20.0 |
| 10.6 | 80 | 7.5–8 | 100 | 2,000 | 17.9 |
| 12.9 | 100 | 7.6–8.2 | 150 | 3,000 | 16.6 |
| 15.4 | 121.1 | 8.4 | 200 | 4,000 | 14.9 |
| 17.5 | 135.6 | 8.4–0 | 0 | 0 | 15.0 |
| Total | 135.6 | | | 10,000 | |

Figure 2:
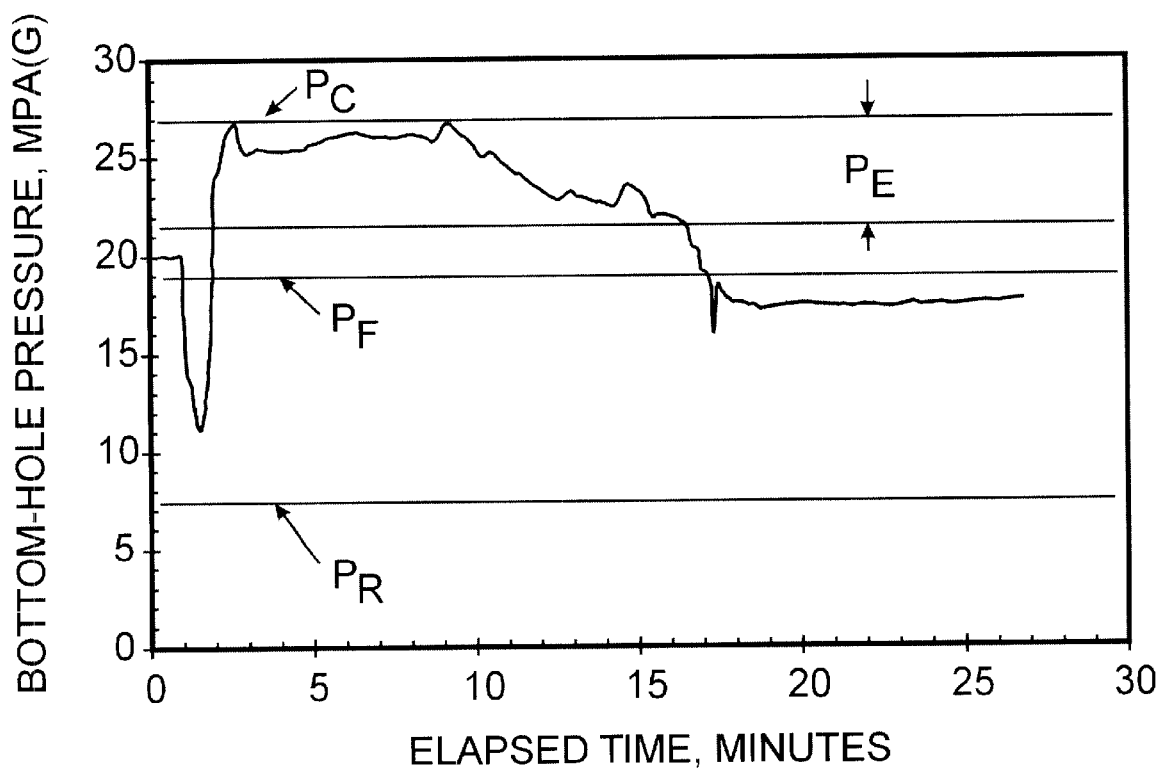
FIG. 2 is a graphical representation of bottom-hole pressure data for the well stimulation in the Example.

Corresponding bottom-hole pressure data for the well stimulation are illustrated in FIG. 2. The stimulation fluid was initially injected through perforations into the coal seam, at a depth of 1,265 m (4,150 ft). FIG. 2 shows that injection began at crack initiation pressure $P_C$ (26.9 MPa(g)) and then the pressure was reduced to $P_E$ in a range from 21.5 to 26.8 MPa(g). As mentioned above, $P_E$ is influenced by the pressure change along the fracture length and the fracture tip toughness. Accordingly, the $P_E$ range is dependent on the particular application. Finally, the pressure decreased to $P_F$ (18.9 MPa(g)) after injection ceased. The total stimulation time was 17.5 min.

$CO_2$ Injection

After well stimulation and a short period of primary CBM production, liquid $CO_2$ Was cyclically injected into the well in 12 injection stages with intervening shut-in stages. 15 metric tons (7,750 m³, 274 Mscf vapor equivalent) of liquid $CO_2$ were injected during each stage. After 12 injections, the total volume of $CO_2$ vapor displaced into the wellbore was 93,050 m³ (3,290 Mscf). A total volume of 91,500 m³ (3.23 Mscf) $CO_2$ vapor was injected coal bed. 1,550 m³ $CO_2$ remained in the wellbore.

At the onset of each injection stage, $CO_2$ was injected at a rate of 100 L/min (26 gal/min) for 5 to 10 minutes. The high injection rate cooled surface lines and wellhead equipment to avoid flashing the liquid $CO_2$ to vapor, which would have caused surface injection pressures to exceed the working pressure of the welhead equipment. The injection rate was reduced to 30 L/min (7.9 gal/min) once the surface lines and wellhead equipment were cooled. The injection rates, volumes and bottom-hole injection pressures for the 12 $CO_2$ injection stages are summarized in Table 6.

TABLE 6

| Injection | Duration (h) | Liquid Injection Volume (metric tons) | Equivalent Vapor Volume | | Equivalent Vapor Injection Rate | | Bottom-Hole Injection Pressure | |
|---|---|---|---|---|---|---|---|---|
| | | | (Mscf) | (m³) | (Mscf/day) | (m³/day) | kPa(a) | psia |
| 1 | 5.55 | 15 | 274 | 7.754 | 1,184 | 33,532 | 13,997 | 2,030 |
| 2 | 5.79 | 15 | 274 | 7.754 | 1,135 | 32,148 | 11,432 | 1,658 |

TABLE 6-continued

| | Duration | Liquid Injection Volume (metric | Equivalent Vapor Volume | | Equivalent Vapor Injection Rate | | Bottom-Hole Injection Pressure | |
|---|---|---|---|---|---|---|---|---|
| Injection | (h) | tons) | (Mscf) | (m³) | (Mscf/day) | (m³/day) | kPa(a) | psia |
| 3 | 4.76 | 15 | 274 | 7.754 | 1,380 | 39,088 | 11,703 | 1,697 |
| 4 | 4.91 | 15 | 274 | 7.754 | 1,340 | 37,937 | 11,380 | 1,650 |
| 5 | 5.31 | 15 | 274 | 7.754 | 1,237 | 35,040 | 11,124 | 1,613 |
| 6 | 6.37 | 15 | 274 | 7.754 | 1,032 | 29,231 | 10,879 | 1,578 |
| 7 | 6.37 | 15 | 274 | 7.754 | 1,032 | 29,231 | 10,536 | 1,528 |
| 8 | 4.96 | 15 | 274 | 7.754 | 1,325 | 37,512 | 11,018 | 1,598 |
| 9 | 6.86 | 15 | 274 | 7.754 | 958 | 27,124 | 10,201 | 1,479 |
| 10 | 4.96 | 15 | 274 | 7.754 | 1,324 | 37,491 | 10,580 | 1,535 |
| 11 | 4.04 | 15 | 274 | 7.754 | 1,625 | 46,014 | 9,866 | 1,431 |
| 12 | 5.08 | 15 | 274 | 7.754 | 1,293 | 36,610 | 10,592 | 1,536 |
| Total | | 180 | 3,286 | 93,051 | | | | |
| Reservoir Total | | 176 | 3,213 | 91,501 | | | | |

After each injection, the wellbore was shut-in for 40 to 44.3 hours. In this example, the shut-in time was 8.1 to 9.0 times $T_{S-CBM}$ (4.93 hours). Because each $CO_2$ injection stage was dependent on injection equipment and operator availability, the shut-in times were much greater than would be required for this cyclic injection/shut-in process. As a result, the shut-in times were greater than would be necessary in a commercial operation.

Data Analysis

Figure 3:
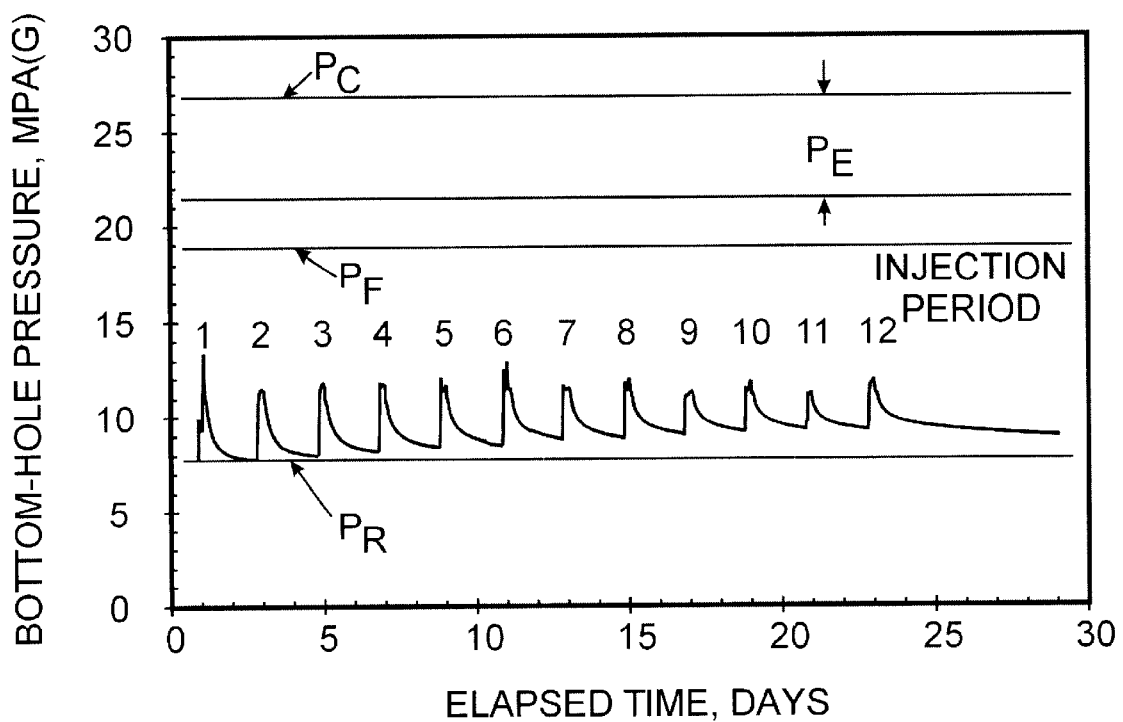
FIG. 3 is a graphical representation of the bottom-hole pressure during $CO_2$ injection and shut-in in the Example.

FIG. 3 illustrates the bottom-hole pressure measured during each injection and shut-in stage, relative to $P_R$, $P_F$, $P_E$ and $P_C$. As illustrated in FIG. 3, $CO_2$ was injected at a pressure >$P_R$, but <$P_F$.

Figure 4:
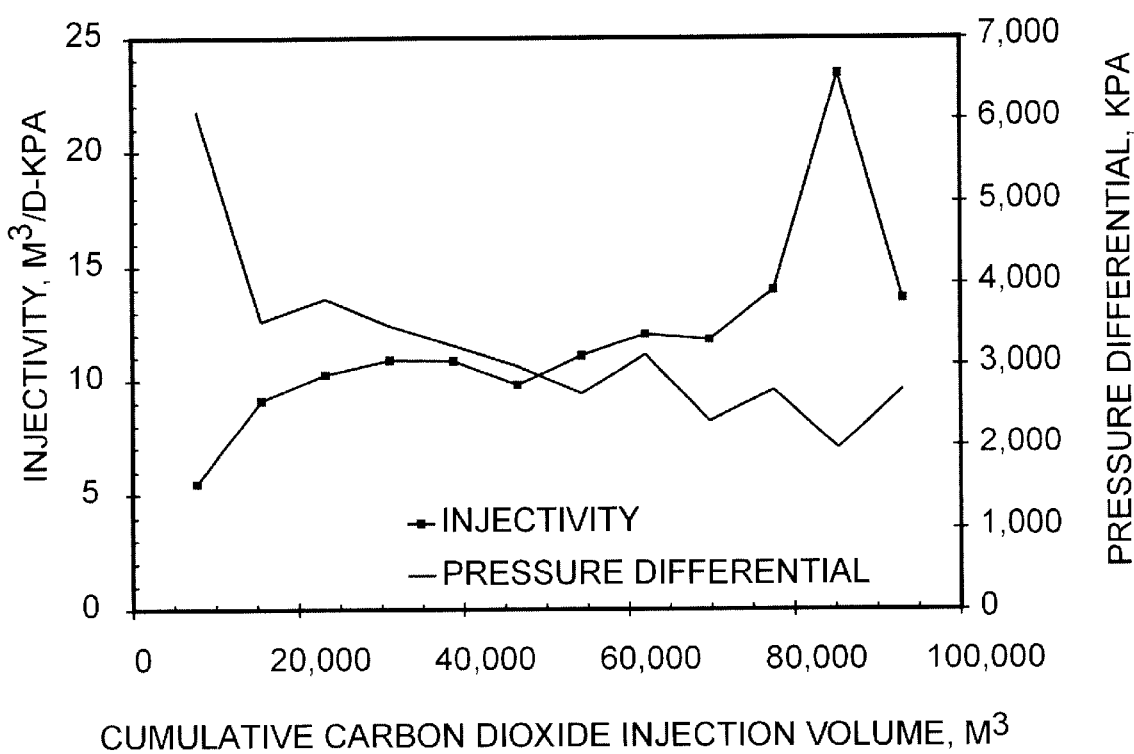
FIG. 4 is a graphical correlation of the pressure differential and injectivity with cumulative $CO_2$ injection volume in the Example.

FIG. 4 illustrates the bottom-hole/reservoir pressure differential and the injectivity during each injection stage as a function of the cumulative $CO_2$ injection volume.

Analysis of the pressure data shows that the near-well effective permeability to gas decreased from 0.53 md to 0.24 md over the 12 SAG injection stages. Pre-injection and post-injection production data showed that the absolute permeability decreased from 3.6 md to 1.0 md, representing an absolute permeability reduction of 72%. The reductions in effective and absolute permeabilities were expected because $CO_2$ is known to swell coal. As discussed above, prior to the inventors' discovery, it has been understood that $CO_2$ injectivity would be significantly reduced as a result of the decreased permeability. Surprisingly and unexpectedly, however, the injectivity increased over the 12 injection stages, even though the absolute permeability decreased. Moreover, SAG was injected more effectively in the Upper Mannville lower permeability reservoir at pressures <$P_F$. The increased injectivity was thought to be due to a reduction in the skin factor corresponding to an increased apparent fracture length.

In FIG. 4, the bottom-hole/reservoir pressure differential is the difference between the bottom-hole pressure at the end and the beginning of the injection stage. As shown in FIG. 4, the bottom-hole/reservoir pressure differential required to inject 15 metric tons of liquid $CO_2$ in each injection stage surprisingly decreased by approximately 55% over the 12 injection stages from 6,100 kPa (885 psi) to 2,700 kPa (392 psi).

As shown in Equation (1), there is an inverse relationship between pressure differential and injectivity. Accordingly, the decrease in bottom-hole/reservoir pressure differential was unexpected because absolute permeability and injectivity were generally expected to both decrease with continued SAG injection. Unexpectedly, the injectivity increased over the 12 injection stages from 5.5 m³/day-kPa (1.3 Mscf/day-psi) to 13.6 m³/day-kPa (3.3 Mscf/day-psi), representing an increase of 147%. Because of the surprising increase in injectivity, $CO_2$ could be injected at pressures well below $P_F$ (18.9 MPa(g)) or $P_E$ (21.5–26.8 MPa(g)).

Figure 5:
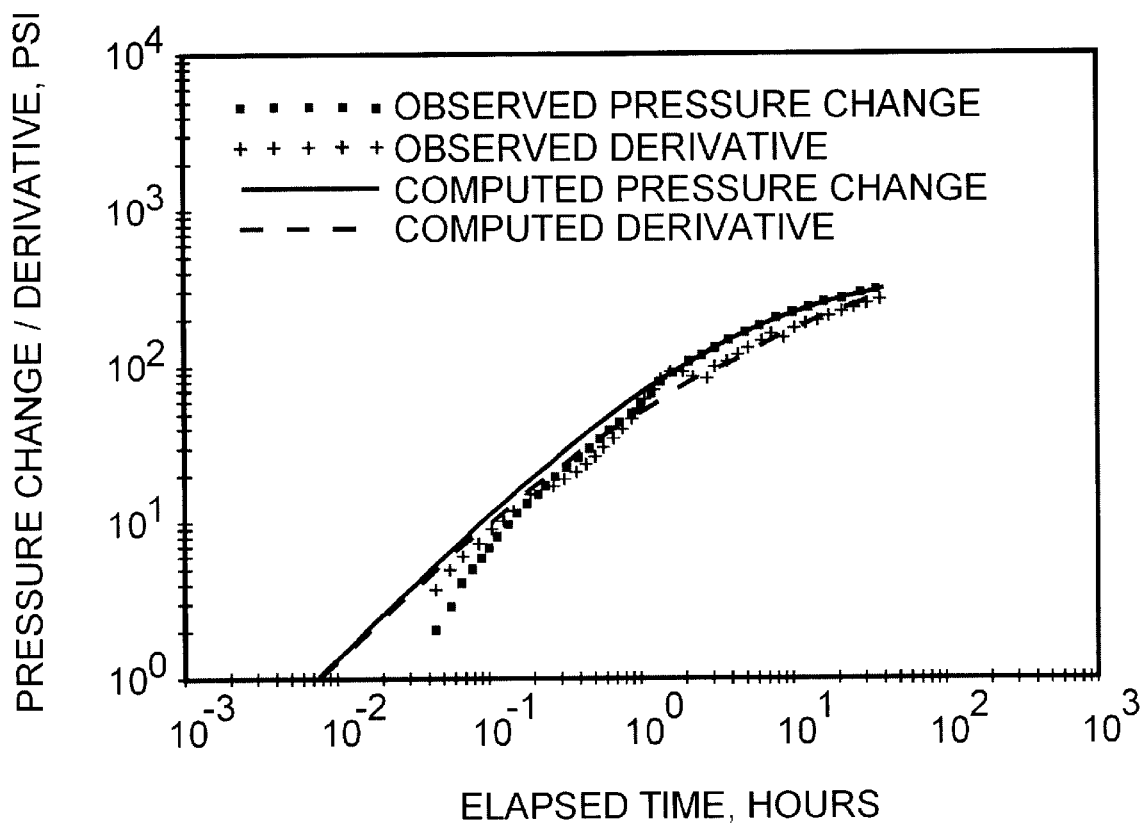
FIG. 5 is a diagnostic graphical representation of the pressure change during the $9^{th}$ shut-in period in the Example.

The effective permeability to gas and skin factor were estimated with the methods referenced earlier, by analysis of pressure data in the fall-off period following each injection stage. The fall-off pressure data between injections are clearly shown in FIG. 3. Pressure data analysis was performed with a combination of type-curve matching and history matching using numerical reservoir models (Agarwal, R. G. et al. "An Investigation of Wellbore Storage and Skin Effect in Unsteady Liquid Flow: I. Analytical Treatment" Soc Pet Eng J pp. 279–290; September 1970). As an example, FIG. 5 is a diagnostic graph of pressure changes and the derivative of pressure changes with respect to time following the 9$^{th}$ injection stage and the match of data computed with numerical reservoir models. As shown in FIG. 5, the match with the pressure changes and derivative values was adequate during the first 10 hours and improved with time thereafter. The quality of the matches was similar for the remaining 11 shut-in stages.

Table 7 summarizes the analysis results for each shut-in stage.

TABLE 7

| Shut-In Stage | Shut-in Duration (hours) | Absolute Permeability (md) | Effective Permeability to Gas (md) | Skin Factor | Apparent Fracture Length | |
|---|---|---|---|---|---|---|
| | | | | | (ft) | (m) |
| Pre-Injection | | 3.6 | 0.53 | | | |
| 1 | 41.37 | | 0.40 | −3.6 | 19.8 | 6.0 |
| 2 | 42.19 | | 0.50 | −4.2 | 36.0 | 11.0 |
| 3 | 42.89 | | 0.50 | −4.2 | 36.0 | 11.0 |
| 4 | 42.97 | | 0.40 | −4.2 | 36.0 | 11.0 |
| 5 | 44.31 | | 0.55 | −4.3 | 39.8 | 12.1 |
| 6 | 40.26 | | 0.51 | −4.3 | 39.8 | 12.1 |
| 7 | 42.31 | | 0.52 | −4.3 | 39.8 | 12.1 |
| 8 | 42.42 | | 0.40 | −4.7 | 59.4 | 18.1 |

TABLE 7-continued

| Shut-In Stage | Shut-in Duration (hours) | Absolute Permeability (md) | Effective Permeability to Gas (md) | Skin Factor | Apparent Fracture Length (ft) | Apparent Fracture Length (m) |
|---|---|---|---|---|---|---|
| 9 | 41.08 | | 0.41 | −4.7 | 59.4 | 18.1 |
| 10 | 42.75 | | 0.30 | −5.1 | 88.6 | 27.0 |
| 11 | 44.34 | | 0.30 | −5.4 | 120.0 | 36.4 |
| 12 | 145.55 | | 0.24 | −5.3 | 102.9 | 31.4 |
| Post-Injection | | 1.0 | 0.24 | | | |

The effective permeability to gas generally decreased through the 12 injection/shut-in stages from the pre-injection estimate of 0.53 md to 0.24 md after injection of 91,500 m³ (3.22 MMscf) $CO_2$, representing a decrease factor of 2.2. The apparent increase in effective permeability during some stages was probably not real because these data were difficult to interpret due to changing water levels in the wellbore.

The overall reduction in absolute permeability was determined by production/shut-in tests performed before and after $CO_2$ injection, accoring to the method described in GRI-94/0397 (ibid). The reductions in absolute permeability and effective permeability to gas were believed to be due to coal swelling caused by sorption of $CO_2$.

As discussed above, a positive skin factor indicates that the formation is damaged and/or its near-well permeability has been reduced by SAG injection. Data analysis shows that the near-well permeability was in fact reduced and continued to decline through the 12 injection stages. Accordingly, the skin factor would have been expected to be a positive number that increases over the 12 injection stages, rather than the negative skin factors actually obtained.

As shown in Table 7, the skin factor surprisingly and unexpectedly was a negative number that continued to become more negative through the 12 injection stages. The skin factor results were used in Equation (4) to determine the apparent fracture length, assuming no reduction in near wellbore permeability. These results are also shown in Table 7.

Figure 6:
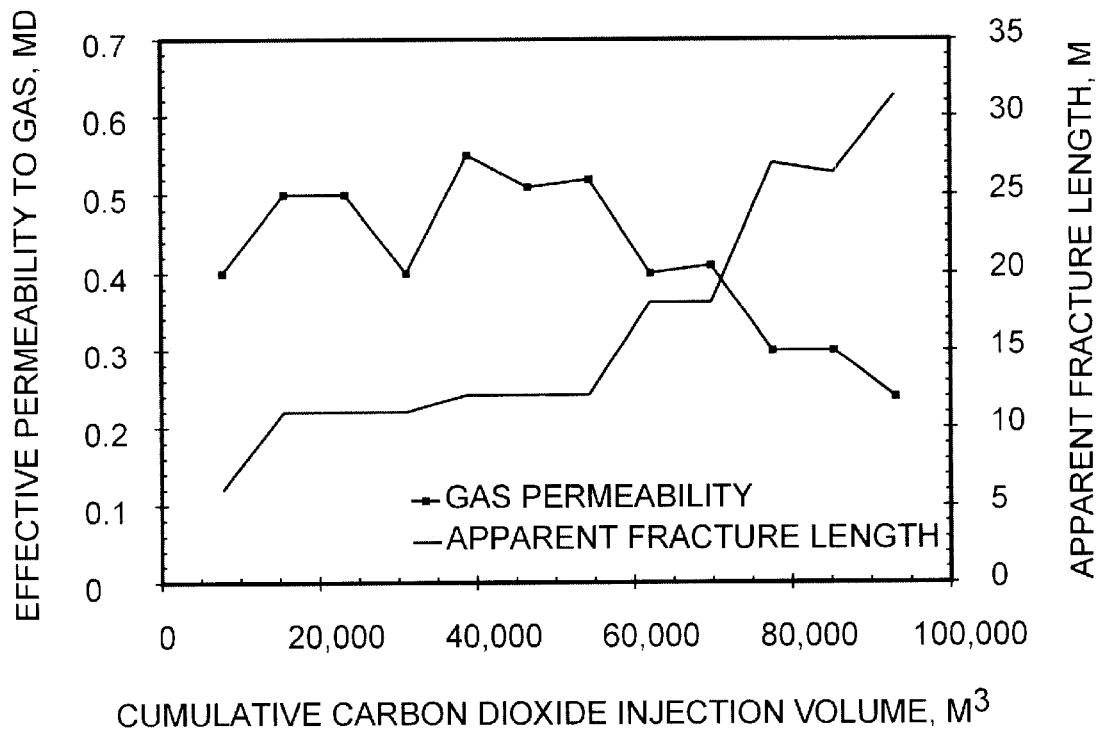
FIG. 6 is a graphical correlation of the effective permeability and induced fracture length with cumulative $CO_2$ injection volume in the Example.

As shown in Table 7 and FIG. 6, the apparent fracture length increased from 6.0 m to a maximum of 36.4 m in the 11$^{th}$ injection stage. These results indicate that the cyclic SAG injection/soak process increased the apparent fracture length possibly due to (1) making more effective use of the existing fracture length by ballooning, (2) making more effective use of the existing fracture length by some other mechanism, (3) actually increasing the fracture's length, or (4) some combination thereof. However, as shown in FIG. 3, the $CO_2$ injection pressures were all below $P_F$. Accordingly, without being bound by theory, it is believed that the cyclic SAG injection/soak process progressively used a greater portion of the fracture length more effectively.

The data in Table 6 also shows that $CO_2$ was injected at a higher rate in the 11$^{th}$ injection stage than previous stages. And, as shown in FIG. 4, the $CO_2$ injectivity was highest in the 11$^{th}$ stage.

As discussed above, it has generally been understood by those skilled in the art that injectivity does not increase with increased injection rates because injection rate changes are understood to be offset in Equation (1) by proportional changes in the bottom-hole/reservoir pressure differential. Also, injectivity, calculated accoring to Equation (2), has generally been understood to decline with time until the injection area stabilizes. By contrast, the inventors discovered that injectivity appears to increase with injection rate and time, despite a concurrent permeability reduction.

The data in Table 6 and FIG. 4 illustrate that an increased injection rate results in increased injectivity, likely due to decreased skin factor during injection. As shown in Table 7, analysis of pressure data for the fall-off period following the 11$^{th}$ stage resulted in the greatest apparent fracture length estimate of 36.4 m.

While the Example was conducted with $CO_2$ as the only SAG, it is believed that other SAGs, such as those identified in Table 3, would produce similar results.

Preferred processes for practicing the invention have been described. It will be understood that the foregoing is illustrative only and that other embodiments of the process can be employed without departing from the true scope of the invention defined in the following claims.

We claim:

1. A process for sequestering a stronger adsorbing fluid in a coal bed, having a SAG sorption time $T_{S-SAG}$, a reservoir pressure $P_R$, a fracture pressure $P_F$, a fracture extension pressure $P_E$, and a crack initiation pressure $P_C$, wherein $P_C > P_E > P_F > P_R$, and having at least one injection well, comprising the steps of:
   (a) stimulating the injection well by
      (i) inducing a fracture in the coal bed by injecting an injection fluid in the injection well at a pressure greater than or equal to $P_C$;
      (ii) extending the fracture by injecting the injection fluid in the injection well at a pressure greater than or equal to $P_E$;
   (b) injecting a stronger adsorbing fluid into the injection well at a pressure greater than $P_R$;
   (c) shutting in the injection well for at least about $0.5T_{S-SAG}$; and
   (d) repeating steps (b) and (c) at least once.

2. The process of claim 1, wherein the injection pressure in one or more subsequent steps (b) is less than $P_F$.

3. The process of claim 1, wherein the injection pressure in one or more subsequent steps (b) is greater than $P_F$.

4. The process of claim 1, wherein the stronger adsorbing fluid is selected from the group consisting of carbon dioxide, nitric oxide, sulfur hexafluoride, hydrogen sulfide, sulfur dioxide, nitrogen dioxide, sulfur trioxide, trichlorofluoromethane, dichlorodifluoromethane, chlorotrifluoromethane, tetrafluoromethane, dichloromonofluoromethane, fluoroform, 1,1,2-trichloro-1,2,2-trifluoroethane, dichlorotetrafluoroethane, hexafluoroethane, chloropentafluoroethane, and combinations thereof.

5. The process of claim 1, wherein the injection fluid in step (a) is selected from the group consisting of carbon dioxide, flue gas, nitrogen, water, and combinations thereof.

6. The process of claim 1, wherein the injection fluid in step (a) is injected at a rate in a range from about 6.7 to about 11 m³/min.

7. The process of claim 1, wherein the injection time in step (a) is in a range from about 10 to about 30 minutes.

8. The process of claim 5, wherein the injection fluid further comprises a proppant.

9. The process of claim 8, wherein the proppant is selected from the group consisting of sand, sintered bauxite, and sintered ceramics.

10. The process of claim 1, wherein the injected proppant mass per unit thickness is in a range from about 1,063 to about 4,250 kg/m.

11. The process of claim 1, wherein the shut-in time in step (c) is in a range from about $0.5T_{S-SAG}$ to about $4T_{S-SAG}$.

12. The process of claim 1, wherein the shut-in time in step (c) is in a range from about $T_{S-SAG}$ to about $2T_{S-SAG}$.

13. The process of claim 1, wherein the injection time in step (b) is selected so that the stronger adsorbing fluid is at least about 50% of the contacted-region-sorbed gas.

14. The process of claim 1, wherein the injection time in step (b) is selected so that the stronger adsorbing fluid is at least about 65% of the contacted-region-sorbed gas.

15. The process of claim 1, wherein the injection time in step (b) is selected so that the stronger adsorbing fluid is at least about 80% of the contacted-region-sorbed gas.

16. The process of claim 1, further comprising a production well for recovering methane from the coal bed.

17. The process of claim 1, wherein the coal bed has an absolute permeability less than or equal to 20 md prior to step (a).

18. The process of claim 1, wherein the coal bed has an absolute permeability less than or equal to 10 md prior to step (a).

19. The process of claim 1, wherein the coal bed has an absolute permeability less than or equal to 5 md prior to step (a).

20. A process for recovering methane from a coal bed, having a SAG sorption time $T_{S-SAG}$, a reservoir pressure $P_R$, a fracture pressure $P_F$, a fracture extension pressure $P_E$ and a crack initiation pressure $P_C$, wherein $P_C > P_E > P_F > P_R$, and having at least one injection well and at least one production well, comprising the steps of:

(a) stimulating the injection well by
  (i) inducing a fracture in the coal bed by injecting an injection fluid in the injection well at a pressure greater than or equal to $P_C$; and
  (ii) extending the fracture by injecting the injection fluid in the injection well at a pressure greater than or equal to $P_E$;

(b) injecting a stronger adsorbing fluid into the injection well at a pressure greater than $P_R$ and recovering methane from the formation;

(c) shutting in the injection well for at least about $0.5T_{S-SAG}$; and (d) repeating steps (b) and (c) at least once.

21. The process of claim 20, wherein the injection pressure in one or more subsequent steps (b) is less than $P_F$.

22. The process of claim 20, wherein the injection pressure in one or more subsequent steps (b) is greater than $P_F$.

23. The process of claim 20, wherein the stronger adsorbing fluid is selected from the group consisting of carbon dioxide, nitric oxide, sulfur hexafluoride, hydrogen sulfide, sulfur dioxide, nitrogen dioxide, sulfur trioxide, trichlorofluoromethane, dichlorodifluoromethane, chlorotrifluoromethane, tetrafluoromethane, dichloromonofluoromethane, fluoroform, 1,1,2-trichloro-1,2,2-trifluoroethane, dichlorotetrafluoroethane, hexafluoroethane, chloropentafluoroethane, and combinations thereof.

24. The process of claim 20, wherein the injection fluid in step (a) is selected from the group consisting of carbon dioxide, flue gas, nitrogen, water, and combinations thereof.

25. The process of claim 20, wherein the injection fluid in step (a) is injected at a rate in a range from about 6.7 to about 11 $m^3$/min.

26. The process of claim 20, wherein the injection time in step (a) is in a range from about 10 to about 30 minutes.

27. The process of claim 20, wherein the injection fluid further comprises a proppant.

28. The process of claim 27, wherein the proppant is selected from the group consisting of sand, sintered bauxite, and sintered ceramics.

29. The process of claim 27, wherein the injected proppant mass per unit thickness is in a range from about 1,063 to about 4,250 kg/m.

30. The process of claim 20, wherein the shut-in time in step (c) is in a range from about $0.5T_{S-SAG}$ to about $4T_{S-SAG}$.

31. The process of claim 20, wherein the shut-in time in step (c) is in a range from about $T_{S-SAG}$ to about $2T_{S-SAG}$.

32. The process of claim 20, wherein the injection time in step (b) is selected so that the stronger adsorbing fluid is at least about 50% of the contacted-region-sorbed gas.

33. The process of claim 20, wherein the injection time in step (b) is selected so that the stronger adsorbing fluid is at least about 65% of the contacted-region-sorbed gas.

34. The process of claim 20, wherein the injection time in step (b) is selected so that the stronger adsorbing fluid is at least about 80% of the contacted-region-sorbed gas.

35. The process of claim 20, wherein the coal bed has an absolute permeability less than or equal to 20 md prior to step (a).

36. The process of claim 20, wherein the coal bed has an absolute permeability less than or equal to 10 md prior to step (a).

37. The process of claim 20, wherein the coal bed has an absolute permeability less than or equal to 5 md prior to step (a).

* * * * *